(12) United States Patent
Arai et al.

(10) Patent No.: US 10,649,891 B2
(45) Date of Patent: May 12, 2020

(54) STORAGE DEVICE THAT MAINTAINS MAPPING DATA THEREIN

(71) Applicant: Toshiba Memory Corporation, Tokyo (JP)

(72) Inventors: Satoshi Arai, Yokohama Kanagawa (JP); Shunitsu Kohara, Yokohama Kanagawa (JP); Kazuya Kitsunai, Fujisawa Kanagawa (JP); Yoshihisa Kojima, Kawasaki Kanagawa (JP); Hiroyuki Nemoto, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/685,269

(22) Filed: Aug. 24, 2017

(65) Prior Publication Data
US 2018/0060228 A1 Mar. 1, 2018

(30) Foreign Application Priority Data

Aug. 24, 2016 (JP) .................................. 2016-164016

(51) Int. Cl.
*G06F 12/02* (2006.01)
*G06F 3/06* (2006.01)
(52) U.S. Cl.
CPC ........ *G06F 12/0246* (2013.01); *G06F 3/0608* (2013.01); *G06F 3/0611* (2013.01);
(Continued)
(58) Field of Classification Search
CPC .. G06F 12/0246; G06F 3/0688; G06F 3/0632; G06F 3/0611; G06F 3/0644; G06F 3/0659; G06F 3/0608; G06F 3/0679; G06F 3/0634; G06F 2212/1048; G06F 2212/7207; G06F 2212/1024; G06F 2212/7201
See application file for complete search history.

(56) References Cited

U.S. PATENT DOCUMENTS

| | | | | |
|---|---|---|---|---|
| 6,098,119 A | * | 8/2000 | Surugucchi | G06F 3/0626 710/10 |
| 7,721,040 B2 | * | 5/2010 | Lasser | G06F 12/0246 711/103 |

(Continued)

FOREIGN PATENT DOCUMENTS

| | | |
|---|---|---|
| JP | 2009176200 A | 8/2009 |
| JP | 2010092285 A | 4/2010 |
| JP | 2011-154516 A | 8/2011 |

OTHER PUBLICATIONS

Notice of Reasons for Refusal dated Aug. 2, 2019 in corresponding Japanese Patent Application No. 2016-164016 with machine English translation, 10 pages.

*Primary Examiner* — Francisco A Grullon
*Assistant Examiner* — Alan Otto
(74) *Attorney, Agent, or Firm* — Kim & Stewart LLP

(57) ABSTRACT

A storage device includes a nonvolatile memory, and a controller configured to perform, in response to commands from the host device, a read operation and a write operation on the nonvolatile memory. The controller divides a logical address space of the storage device into a plurality of subspaces and manages a priority value for each of the subspaces, the priority values of the subspaces determining an order for setting up the subspaces upon start-up of the storage device.

20 Claims, 26 Drawing Sheets

NS MANAGEMENT TABLE 540

| NSID | LOCATION INFORMATION GROUP ADDRESS | LOG BLOCK ID | START-UP PRIORITY |
|---|---|---|---|
| 0 | A | 0, 7, 99, ... | 3 |
| 1 | B | 1, 4, 52, ... | 2 |
| 2 | C | 2, 8, 38, ... | 1 |
| 3 | D | 3, 6, 67, ... | 4 |

(52) U.S. Cl.
CPC .......... *G06F 3/0632* (2013.01); *G06F 3/0634* (2013.01); *G06F 3/0644* (2013.01); *G06F 3/0659* (2013.01); *G06F 3/0679* (2013.01); *G06F 3/0688* (2013.01); *G06F 2212/1024* (2013.01); *G06F 2212/1048* (2013.01); *G06F 2212/7201* (2013.01); *G06F 2212/7207* (2013.01)

(56) References Cited

U.S. PATENT DOCUMENTS

| | | | |
|---|---|---|---|
| 8,131,990 B2 * | 3/2012 | Emori | G06F 3/0611 701/400 |
| 8,370,570 B2 | 2/2013 | Motonaga et al. | |
| 2004/0044853 A1 * | 3/2004 | Gibble | G06F 3/0605 711/154 |
| 2011/0185213 A1 | 7/2011 | Yoshida et al. | |
| 2014/0281145 A1 * | 9/2014 | Tomlin | G06F 12/0246 711/103 |
| 2015/0178010 A1 | 6/2015 | Chang et al. | |
| 2017/0017555 A1 | 1/2017 | Kitsunai et al. | |

* cited by examiner

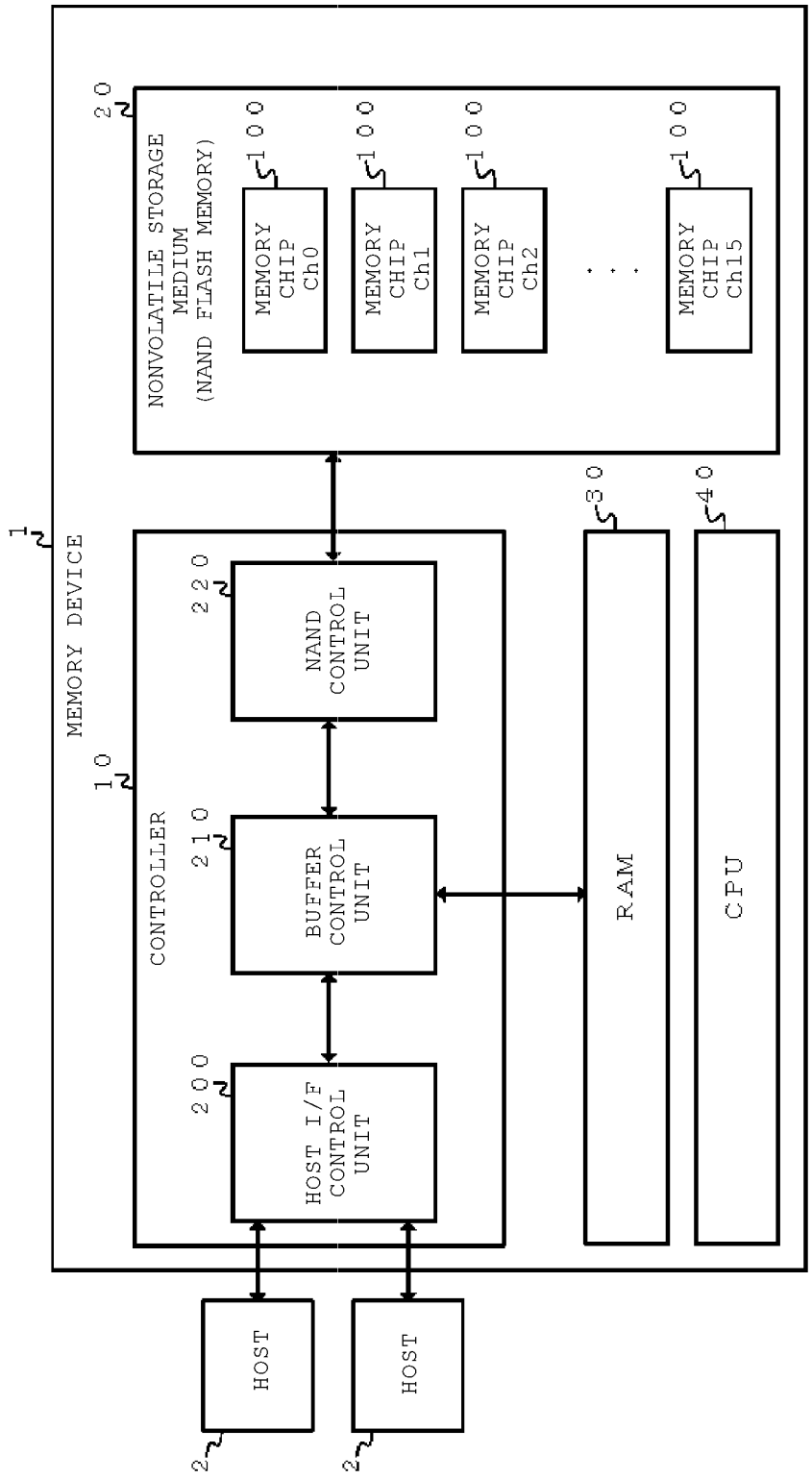

FIG. 10B

| NSID | LOG BLOCK ID |
|---|---|
| 0 | #0 (L), #1 (L), ... |
| 1 | #1 (U), ... |
| 2 | #0 (U), ... |

OLD → NEW

FIG. 13

NS MANAGEMENT TABLE 540

| NSID | LOCATION INFORMATION GROUP ADDRESS | LOG BLOCK ID | START-UP PRIORITY |
|---|---|---|---|
| 0 | A | 0, 7, 99, ... | 3 |
| 1 | B | 1, 4, 52, ... | 2 |
| 2 | C | 2, 8, 38, ... | 1 |
| 3 | D | 3, 6, 67, ... | 4 |

FIG. 16A
NS MANAGEMENT TABLE
| NSID | START-UP PRIORITY |
|---|---|
| 0 | 3 |
| 1 | 2 |
| 2 | 1 |
| 3 | 4 |
FIG. 16B
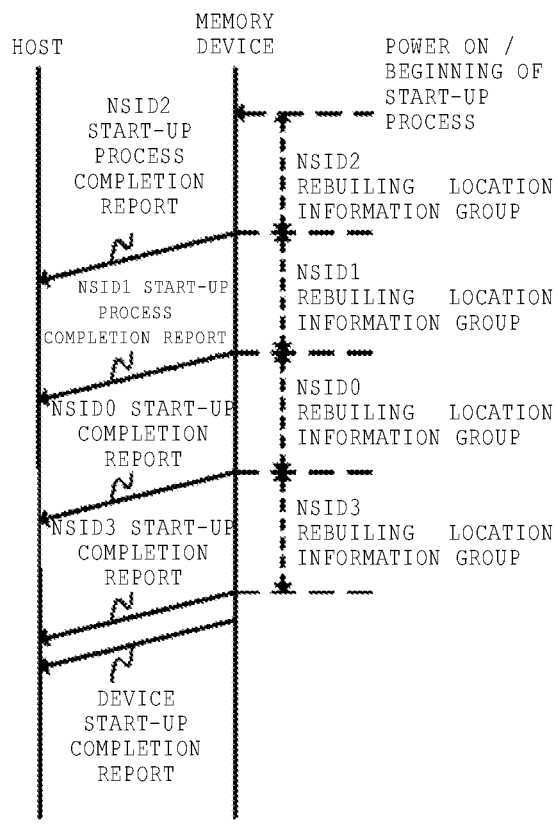
FIG. 16C
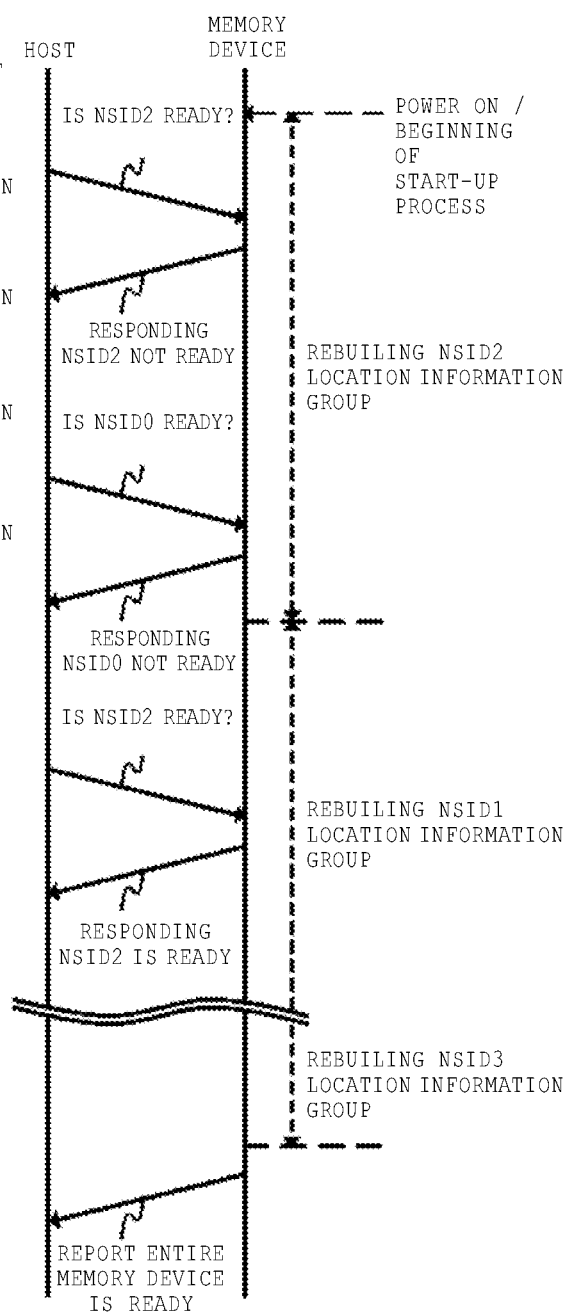

FIG. 18A
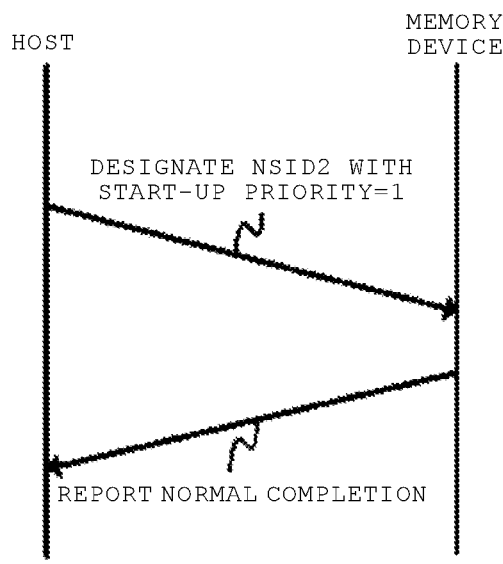
FIG. 18B
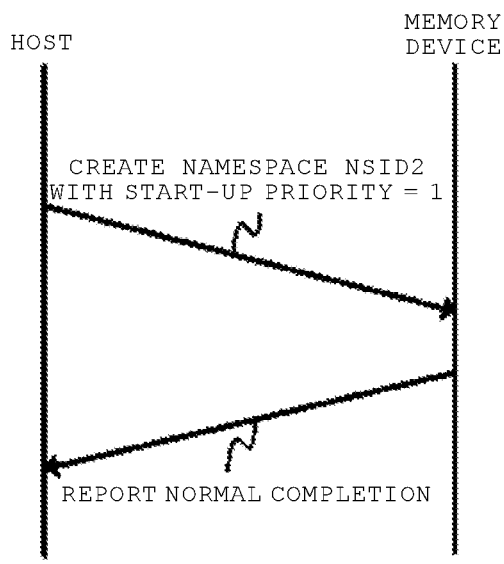
FIG. 19A
| NSID | START-UP PRIORITY | USAGE |
|---|---|---|
| 0 | 3 | APPLICATION PROGRAMS |
| 1 | 2 | SYSTEM FILES |
| 2 | 1 | BOOT RECORD, OS KERNEL IMAGE |
| 3 | 4 | USER DATA |
| 4 | 5 | BACKUP DATA |

FIG. 20A

| NSID | START-UP PRIORITY | USAGE |
|---|---|---|
| 0 | 3 | USER DATA A |
| 1 | 2 | USER DATA B |
| 2 | 1 | OS |
| 3 | 4 | USER DATA C |

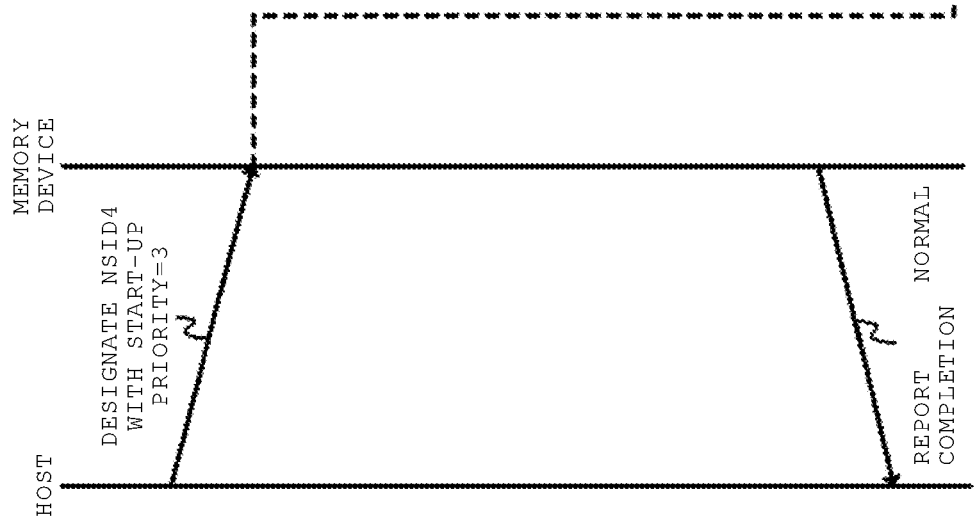

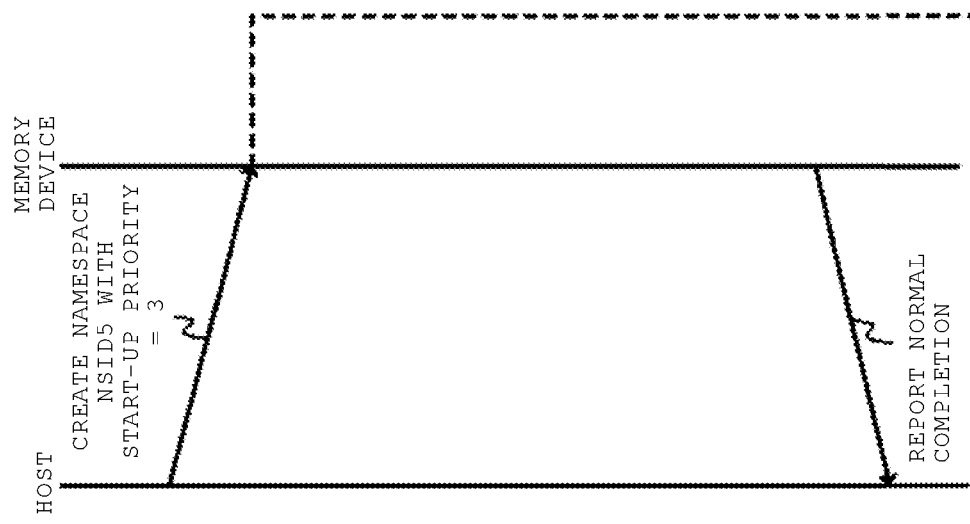

FIG. 24A
NS MANAGEMENT TABLE
| NSID | START-UP PRIORITY |
|---|---|
| 0 | 3 |
| 1 | 2 |
| 2 | 1 |
| 3 | 4 |
| 4 | 5 |
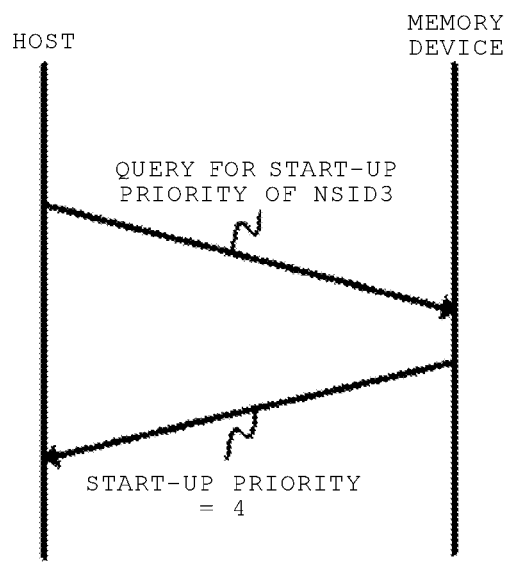
FIG. 24B
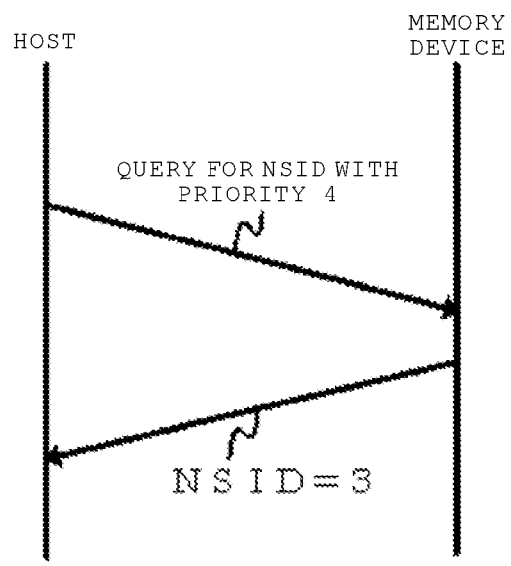
FIG. 24C

STORAGE DEVICE THAT MAINTAINS MAPPING DATA THEREIN

CROSS-REFERENCE TO RELATED APPLICATION

This application is based upon and claims the benefit of priority from Japanese Patent Application No. 2016-164016, filed Aug. 24, 2016, the entire contents of which are incorporated herein by reference.

FIELD

Embodiments described herein relate generally to a storage device.

BACKGROUND

A storage device carries out an initialization process for each data unit when the storage device is started. As a capacity of the storage device increases, the time required to complete the initialization process becomes longer. On the other hand, there is a technique for dividing a logical address space of the storage device into a plurality of subspaces and managing each subspace separately.

DESCRIPTION OF THE DRAWINGS

FIG. 1 is a block diagram of a memory device according to an embodiment.

FIGS. 10A and 10B illustrate a second example of the log region allocation method according to the embodiment.

FIG. 13 illustrates a structure of an NS management table according to the embodiment.

FIGS. 16A to 16C illustrate a management table and two examples of an operation sequence of an operation to report start-up process completion to a host in the embodiment, respectively.

FIGS. 18A and 18B are sequence charts of operations of setting a start-up priority in the embodiment.

FIGS. 19A and 19B illustrate a management table and an example of a sequence of setting the start-up priority and reporting a start-up process completion for each namespace in the embodiment, respectively.

FIGS. 20A and 20B illustrate a management table and an example of a sequence of setting the start-up priority and reporting a start-up process completion for each namespace in the embodiment, respectively.

FIGS. 21A to 21C illustrates an operation sequence and transition of a management table during an operation to set the start-up priority when there is overlap of designated start-up priorities in the embodiment.

FIGS. 22A to 22C illustrates another operation sequence and transition of a management table during an operation for setting the start-up priority when there is overlap of designated start-up priorities in the embodiment.

FIGS. 24A to 24C illustrate a management table and two operation sequences of inquiring the start-up priority in the embodiment.

DETAILED DESCRIPTION

Figure 2A:
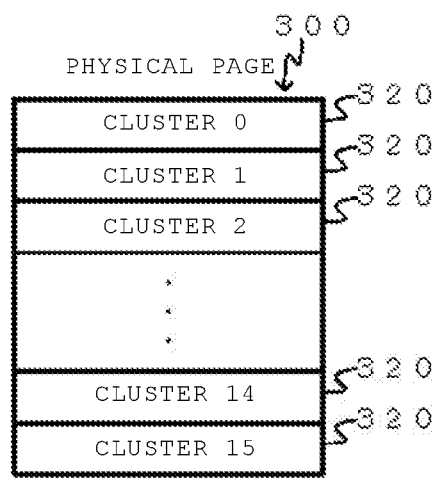
FIGS. 2A and 2B schematically illustrate configurations of a physical page and a physical block according to the embodiment, respectively.

An embodiment provides a memory device capable of shortening a start-up time and a control method thereof.

In general, according to an embodiment, a storage device includes a nonvolatile memory, and a controller configured to perform, in response to commands from the host device, a read operation and a write operation on the nonvolatile memory. The controller divides a logical address space of the storage device into a plurality of subspaces and manages a priority value for each of the subspaces, the priority values of the subspaces determining an order for setting up the subspaces upon start-up of the storage device.

In the following, a storage device (which is referred to hereinafter as a memory device) of an embodiment will be described with reference to the drawings. In the following description, elements having the same function and configuration are denoted by common reference numerals.

FIG. 1 is a block diagram of a memory device according to an embodiment.

The memory device 1 includes a controller 10, a nonvolatile storage medium 20 that stores data, a random access memory (RAM) 30 which temporarily stores various kinds of information and is also used as a buffer for temporarily storing data transmitted between the host 2 and the nonvolatile storage medium 20, and a central processing unit (CPU) 40 which controls the memory device 1 based on firmware (FW).

In the present embodiment, the host 2 is a computer which supports an interface conforming to NVM Express® (NVMe) standard, but may be another computer which supports an interface conforming to other standards, for example, the serial attached SCSI (SAS) standard or the serial ATA (SATA) standard.

The controller 10 is, for example, a semiconductor integrated circuit configured as a system on a chip (SoC).

In the present embodiment, the nonvolatile storage medium 20 is a NAND flash memory and includes a plurality of NAND flash memory chips 100 (in the following, referred to as memory chip 100), but may be other types of nonvolatile storage medium such as a magnetic disk. In the following, the nonvolatile storage medium 20 is referred to as the NAND flash memory 20 (in the following, simply may be referred to as NAND). The NAND flash memory 20 of the present embodiment includes the memory chips 100 of 16 channels (Chs). In the following, respective memory chips 100 are denoted as the memory chips Ch0 to Ch15. The number of channels may be greater than or less than 16.

In the present embodiment, the RAM 30 is a dynamic random access memory (DRAM), but may be other types of volatile memories such as a static random access memory (SRAM).

The RAM 30 and the CPU 40 may be built in the controller 10 without being separated as a plurality of semiconductor integrated circuits. In the following description, some or all of functions realized by executing FW may also be realized by dedicated hardware (HW) and some or all of functions realized by HW may also be realized by executing FW.

The controller 10 includes a host interface (IF) control unit 200 which controls communication with the host 2 or manages a plurality of hosts 2 connected thereto, a buffer control unit 210 which controls reads from and writes to the RAM 30, and a NAND control unit 220 which controls reads from and writes to the NAND flash memory 20. The host IF control unit 200 can report a result of a command of various type received from the host 2 to the host 2 in accordance with an instruction of the CPU 40 based on FW.

Next, a configuration of a physical page 300 and a physical block 310 of a memory chip 100 will be described with reference to FIGS. 2A and 2B.

As illustrated in FIG. 2A, a minimum management unit in logical-to-physical address translation (explained later) is called a cluster 320. In the present embodiment, a size of the cluster 320 is 4 kB. A minimum configuration unit with which reading and writing of data at one time within the memory chip 100 is referred to as the physical page 300. In the present embodiment, a size of the physical page 300 is 16 clusters (4 kB×16 clusters=64 kB).

Figure 2B:
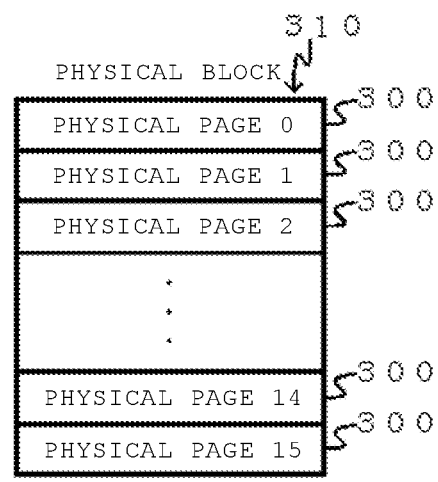

As illustrated in FIG. 2B, a minimum configuration unit with which erasing of data from the memory chip 100 is referred to as the physical block 310. In the present embodiment, a size of the physical block 310 is 16 physical pages (64 kB×16 physical pages=1024 kB), that is, 256 clusters. The sizes are not limited to these examples.

Next, configurations of a logical page 400 and a logical block 410 will be described with reference to FIGS. 3A and 3B.

Figure 3A:
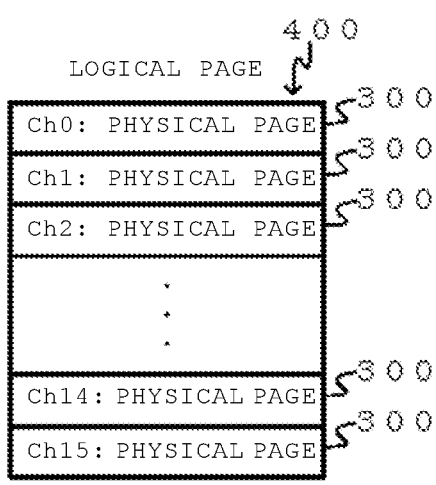
FIGS. 3A and 3B schematically illustrate configuration of a logical page and a logical block according to the embodiment, respectively.
Figure 3B:
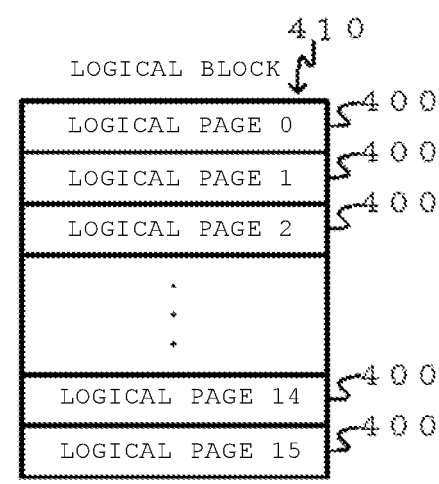

In the present embodiment, as illustrated in FIG. 3A, a set of physical pages 300 each of which is included in each single memory chip of memory chips Ch0 to Ch15 makes up a logical page 400. The controller 10 controls writing of data with respect to the NAND flash memory 20 using the logical page 400 as a logical unit. As illustrated in FIG. 3B, the controller 10 controls erasing of data from the NAND flash memory 20 using a logical block 410, which includes data that amount to 16 logical pages 400, as a logical unit. That is, the controller 10 performs erase processing not per physical block 310, which is the minimum unit of erasing of data of the memory chip 100, but per logical block 410.

Figure 4:
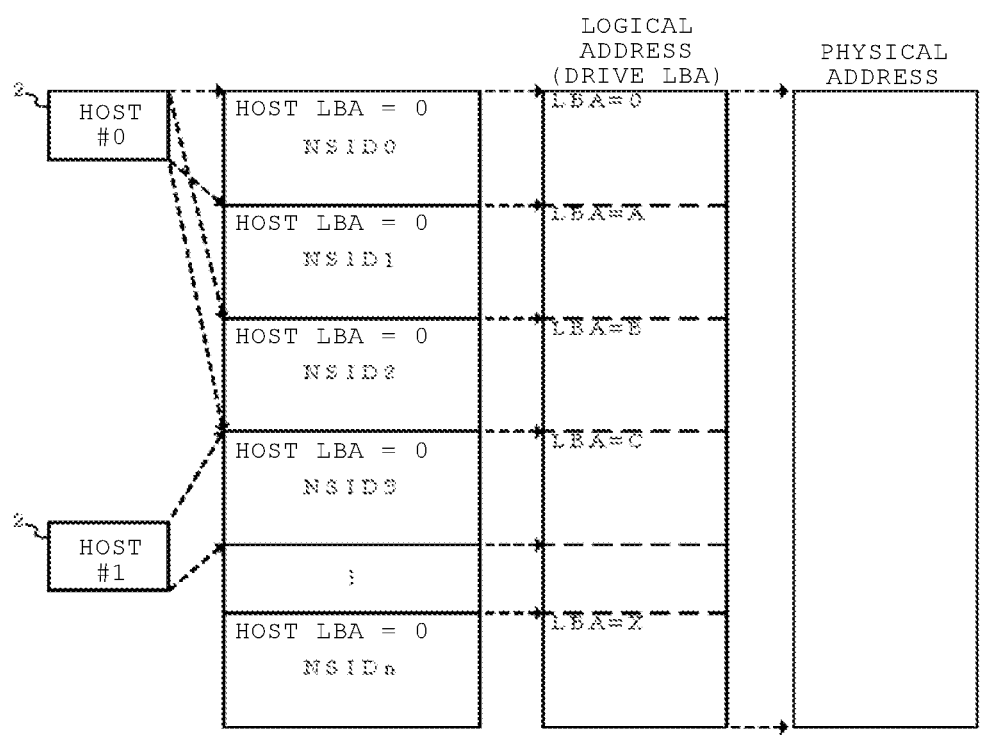
FIG. 4 illustrates a logical address space divided into subspaces in the embodiment.

Next, subspace will be described with reference to FIG. 4.

A drive logical address (logical block address (LBA)) is managed by the memory device 1 and corresponds to a physical address of NAND flash memory 20 in which user data are stored in a one-to-one relationship. Here, the user data refers to a piece of data transmitted together with a write request from the host 2. In the following, the logical address which corresponds to the physical address in the one-to-one relationship is referred to as the drive LBA.

The drive LBA space is divided into a plurality of subspaces. A subspace is referred to as a namespace in the NVMe standard or a logical unit in the SCSI standard. In the following, a subspace is referred to as a namespace. Each namespace is identified by a namespace ID (NSID). In the present embodiment, the drive LBA space is divided into (n+1) namespaces identified as NSID0 to NSIDn.

Each namespace can be provided as a storage region independently from each other to the host 2. A drive LBA of the memory device 1 is derived from a combination of an NSID and a host LBA starting with 0 for each namespace. Here, the host LBA is a logical address designated when the host 2 issues a command in order to designate a location (an access destination) of data in the memory device 1.

The host IF control unit 200 performs a conversion between the host LBA designated by the command and the drive LBA. For example, as illustrated in FIG. 4, when the host 2 accesses a host LBA=0 of NSID2, a drive LBA=B is derived as an access destination by the host IF control unit 200.

Each namespace is created by a command from the host 2. That is, the host 2 issues the command to the memory device 1 designating an NSID of a namespace and a storage capacity to be allocated to the namespace. An empty region not associated with any namespace may be present in the memory device 1, and thus a drive LBA not allocated to any namespace may be present.

When the memory device 1 is connected with a plurality of hosts 2, a namespace accessible by each host 2 may be limited. For example, it may be set in such a way that the host #0 is able to access only NSID0 and NSID2 and the host #1 is able to access only NSID3.

Figure 5:
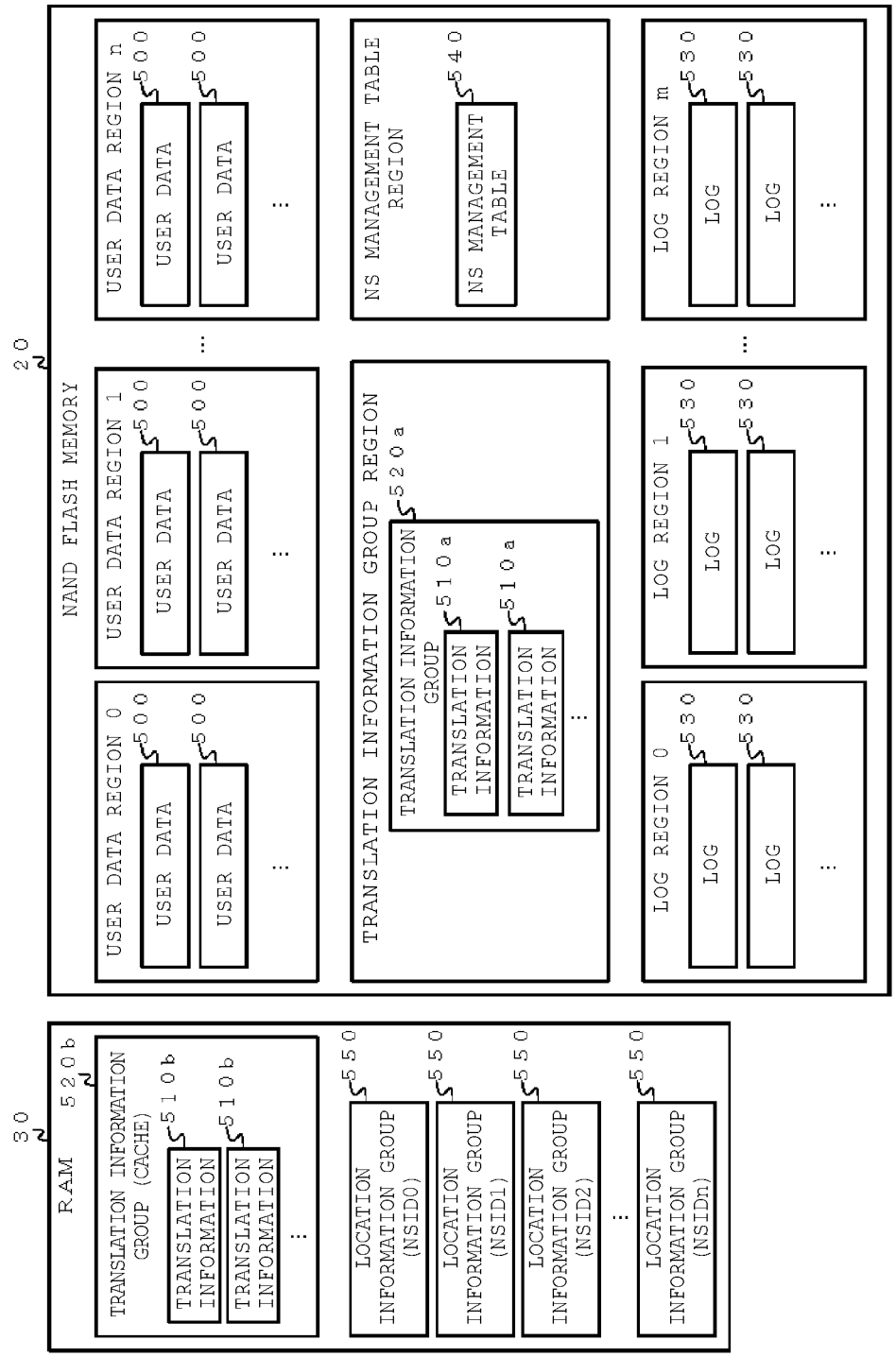
FIG. 5 illustrates layout of user data and management data stored in the memory device according to the embodiment.

Next, a memory configuration of the present embodiment will be described with reference to FIG. 5.

In the NAND flash memory 20, user data 500, a translation information group 520a, logs 530, and an NS management table 540 are stored.

Translation information group 520a includes a plurality of pieces of translation information 510a, and each piece of translation information 510a indicates correspondence between a drive LBA and a physical address. Each of the log 530 indicates a change in correspondence between the drive LBA and the physical address. The NS management table 540 is a table for managing a start-up priority or the like of each namespace.

The controller 10 manages the NAND flash memory 20 including (n+1) user data regions for storing pieces of user data 500, a translation information group region for storing the translation information group 520a, and (m+1) log regions for storing logs 530, and a management NS management table region for storing the NS management table 540. Each user data region corresponds to each namespace in a one-to-one relationship. Although each log region corresponds to one namespace, each namespace may correspond to a plurality of log regions. That is, for example, a log region 0 does not correspond to both the NSID0 and NSID1, but the NSID0 may be corresponded to the log region 0 and the log region 1.

Although the controller 10 uses each single logical page 400 as a region for both the user data region and the log region, the controller 10 may use some logical pages exclusively for the user data region and some other logical pages exclusively for the log region.

In addition, as long as the controller 10 can recognize the relationship between the host LBAs and the drive LBAs corresponding to each namespace, the controller 10 may mix user data of multiple namespaces in a single user data region. For example, pieces of user data 500 corresponding to a plurality of namespaces may be stored in a single user data region and a log 530 of each namespace may be stored separately in a log region allocated to each namespace.

The controller 10 may however also mix logs 530 of multiple namespaces in a single log region, and an NSID may be included in the logs 530 stored in the single log region. In this case, in the following description, for example, a log region corresponding to the NSID0 refers to a log region in which the logs 530 including the NSID0 are stored.

In the RAM 30, each piece of translation information 510a is copied from the translation information group region of the NAND flash memory 20 and stored as a piece of translation information (cache) 510b. In the following, a set of pieces of translation information (cache) 510b stored in the RAM 30 is referred to as a translation information group (cache) 520b. In the RAM 30, a location information group 550 is stored for each namespace. Although details will be described below, each location information group 550 includes location information 560, and each piece of location information 560 records a piece of information indicating a location of translation information 510a and translation information (cache) 510b.

Next, the conversion from the host LBA to the physical address using the translation information 510 will be described with reference to FIG. 6. In the present embodiment, the translation information 510a in the translation information group 520a and translation information (cache) 510b in the translation information group (cache) 520b have the same data structure. As long as the translation information 510a and the translation information (cache) 510b represent the same contents, data structures of the translation information 510a and the translation information (cache) 510b may differ. For example, a compressed piece of translation information data may be stored in the translation information 510a.

Figure 6:
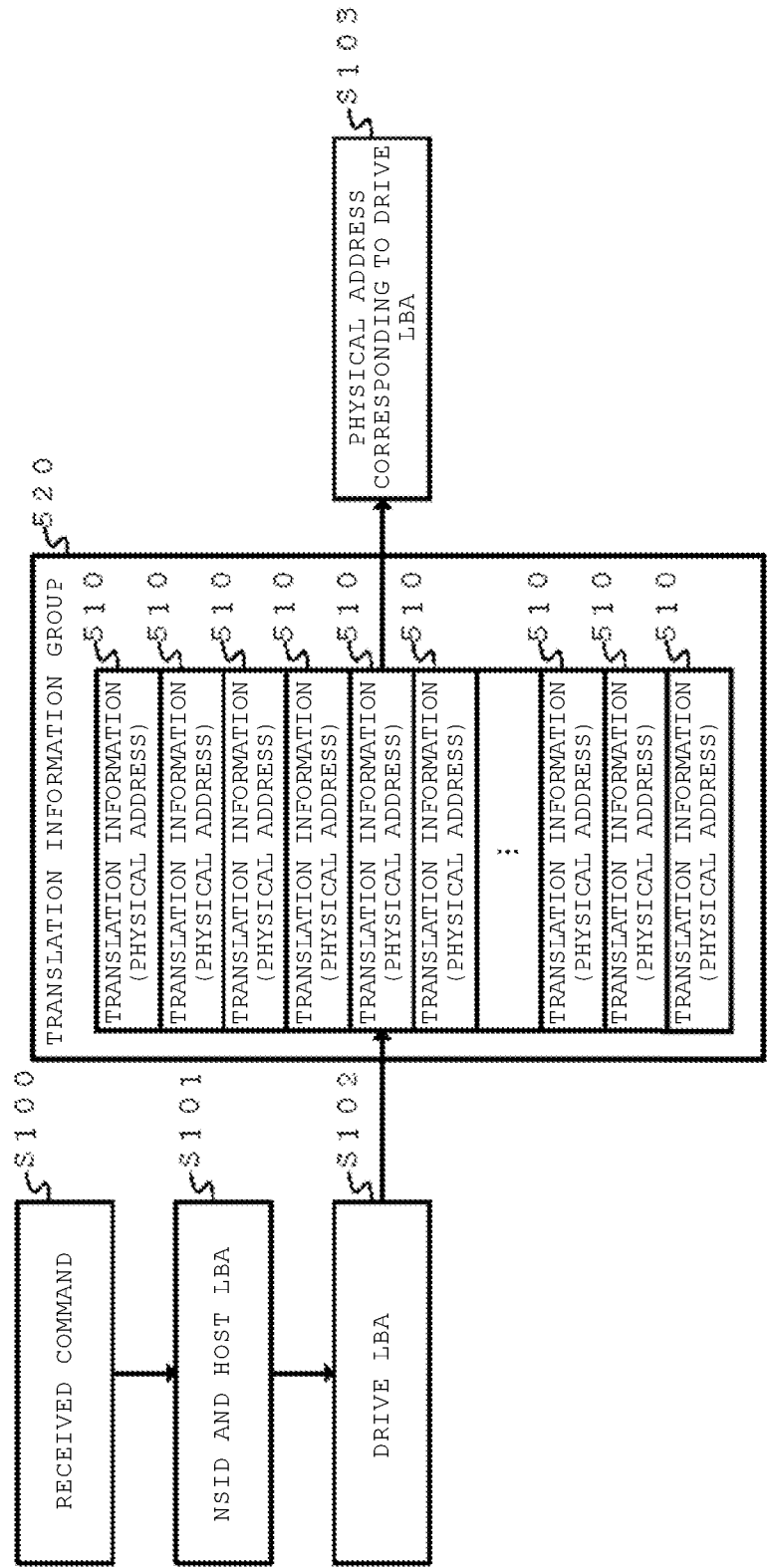
FIG. 6 illustrates read/write control of user data using translation information in the embodiment.

In FIG. 6 and the following description, the translation information group 520a and the translation information group (cache) 520b are collectively denoted as the translation information group 520, and the translation information 510a and the translation information (cache) 510b are collectively denoted as the translation information 510.

When the memory device 1 receives a command from the host 2 (S100), the host IF control unit 200 extracts an NSID and a host LBA from the command (S101) and calculates the drive LBA using the NSID and the host LBA (S102).

In the present embodiment, a physical address of the NAND flash memory 20 is recorded in each piece of translation information 510, and respective pieces of translation information 510 are arranged in order of the drive LBA correlated with the user data 500. That is, the CPU 40 retrieves the translation information group 520 by executing FW using the drive LBA as an index. As a result, the CPU 40 can acquire the physical address correlated with each user data 500 (S103). Respective pieces of translation information may not be arranged in order of the drive LBA as long as the CPU 40 can recognize a correspondence between each drive LBA and each piece of translation information.

In the present embodiment, a piece of information indicating an "Unmapped" state is recorded in the translation information 510 corresponding to the drive LBA which is not correlated with any user data 500. A plurality of correspondences may be recorded in a single piece of translation information 510.

Each piece of translation information 510 is stored in the NAND flash memory 20 while power for operating the memory device 1 is not supplied. Access to the NAND flash memory 20 is generally slower than access to the RAM 30. For that reason, each piece of translation information 510 is preferably copied (cached) to the RAM 30 as soon as possible after the power begins being supplied to the memory device 1. All the pieces of translation information 510 may not be copied immediately after the power supply, but may be copied to the RAM 30 in response to an attempt to access to the corresponding drive LBA.

Next, an example of a data structure of a location information group 550 stored in the RAM 30 will be described with reference to FIG. 7.

Figure 7:
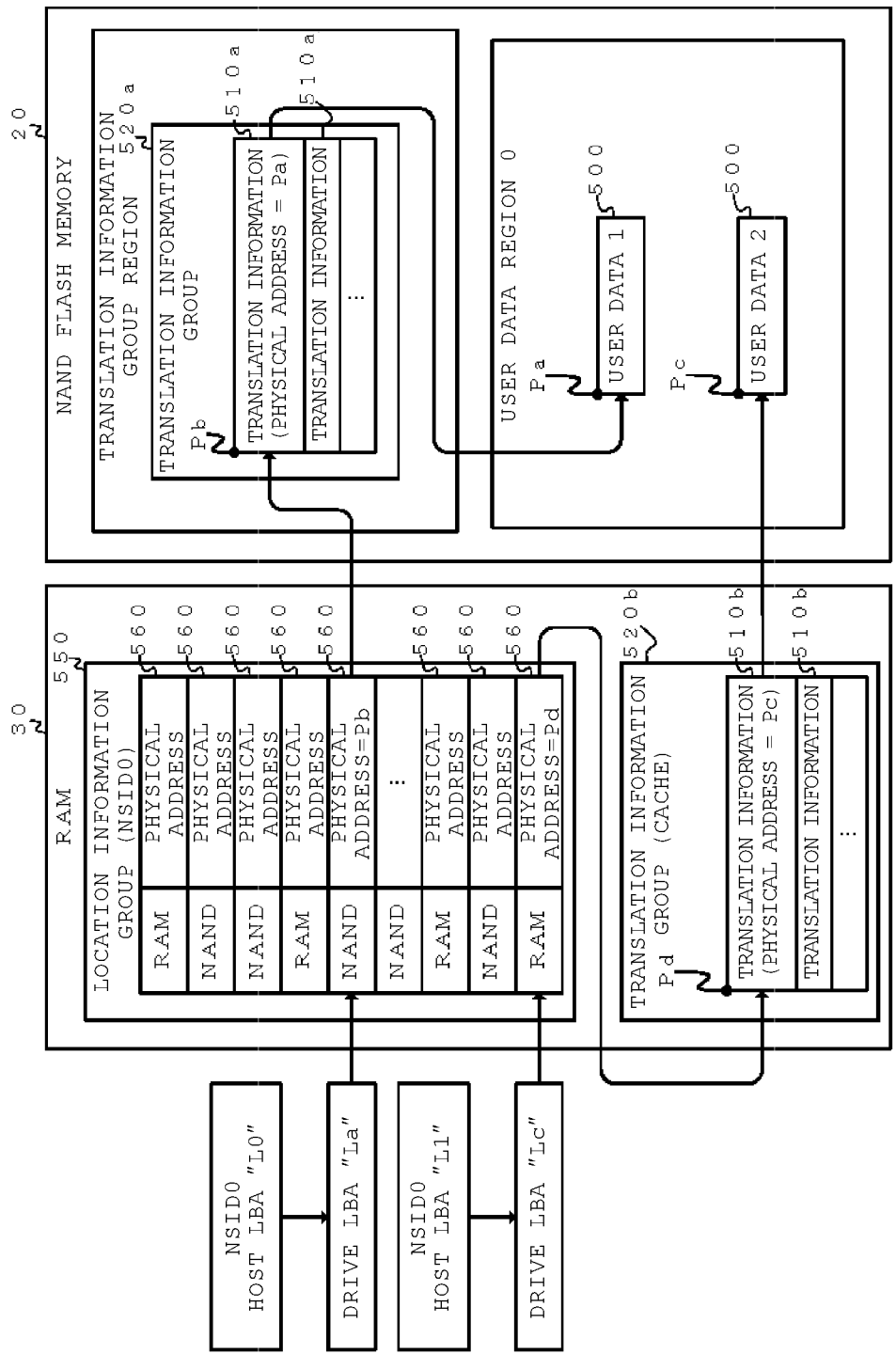
FIG. 7 illustrates an operation of storing location information in the embodiment.

In FIG. 7, although only location information group 550 of NSID0 is illustrated, other location information groups 550 of other namespaces also have the same configuration. The location information group 550 includes a plurality of pieces of location information 560. Each piece of location information 560 corresponds to a single piece of translation information 510 in a one-to-one relationship and records a region where each piece of translation information 510 is stored (that is, RAM 30 or NAND flash memory 20 used as a cache) and a physical address of the region.

Respective pieces of location information 560 are arranged in the same order as pieces of corresponding translation information 510, that is, in order of the drive LBA correlated with the user data 500. For that reason, the CPU 40 can retrieve the location information group 550 using the drive LBA as an index, that is, acquire the physical address of the RAM 30 or NAND flash memory 20 in which the translation information 510 corresponding to each user data 500 is stored.

In FIG. 7, a drive LBA corresponding to a host LBA "L0" of NSID0 is a "La" and a piece of location information 560 corresponding to the "La" is a physical address "Pb" of the NAND flash memory 20. In a region having the physical address "Pb" of the NAND flash memory 20, a "physical address=Pa" of the NAND flash memory 20 is stored as a piece of translation information 510a. That is, user data 1 corresponding to the host LBA "L0" of NSID0 is stored in a region having the physical address "Pa" of the NAND flash memory 20.

A drive LBA corresponding to a host LBA "L1" of NSID0 is a "Lc" and a piece of location information 560 corresponding to the "Lc" is a physical address "Pd" of the RAM 30. In a region having the physical address "Pd" of the RAM 30, a "physical address=Pc" of the NAND flash memory 20 is stored as apiece of translation information (cache) 510b. That is, user data 2 corresponding to the host LBA "L1" of NSID0 are stored in a region having the physical address "Pc" of the NAND flash memory 20.

Next, an example of a log 530 will be described with reference to FIG. 8.

Figure 8:
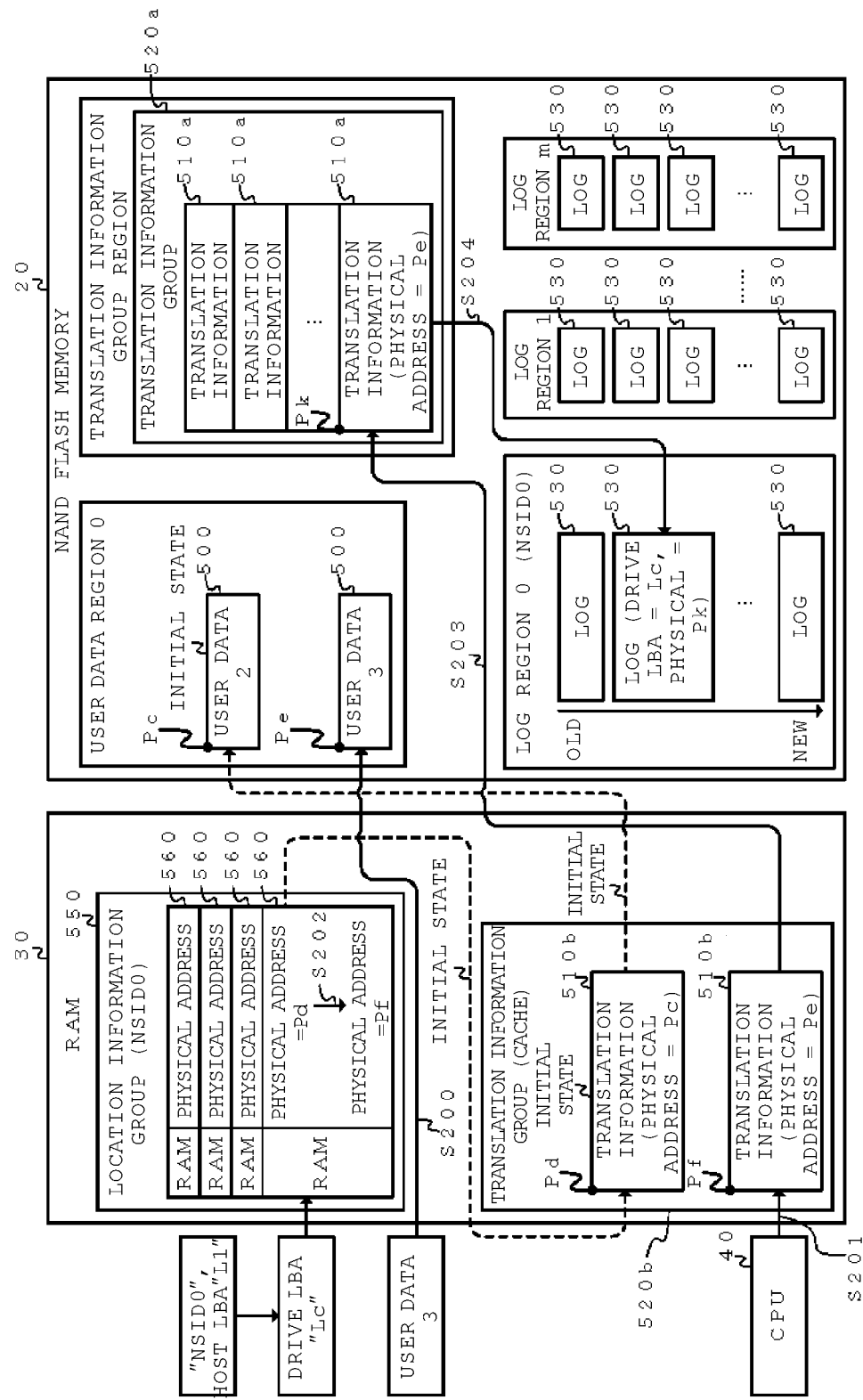
FIG. 8 illustrates an operation of recording a log in the embodiment.

In an initial state in FIG. 8, a drive LBA corresponding to a host LBA "L1" of NSID0 is "Lc" and the user data 2 corresponding to the drive LBA "Lc" is assumed to be stored in the region having the physical address "Pc" of the NAND flash memory 20. In this case, the translation information (cache) 510b indicating an association of the drive LBA "Lc" and the physical address "Pc" is stored in the physical address "Pd" of the RAM 30.

In this state, a write request for host LBA "L1" of NSID0 and user data 3 are transmitted from the host 2. At this time, the CPU 40 controls the controller 10 such that user data 3 is to be stored in a region having a physical address "Pe" in which, no valid data is stored, of the NAND flash memory 20 (S200). The CPU 40 adds a new piece of translation information (cache) 510b (physical address "Pe") to a physical address "Pf" of the RAM 30 (S201). The CPU 40 rewrites apiece of location information 560 corresponding to the drive LBA "Lc" from the physical address "Pd" of the RAM 30 to the physical address "Pf" of the RAM 30 (S202).

The added translation information (cache) 510*b* (physical address "Pe") is saved in the translation information group 520*a* of the NAND flash memory 20 by the time the power supply to the memory device 1 is interrupted (S203). Here, it is assumed that translation information (cache) 510*b* (physical address "Pe") corresponding to the drive LBA "Lc" is saved in a physical address "Pk" of the NAND flash memory 20.

The CPU 40 stores a log 530 in a log region 0, indicating that the translation information (cache) 510*b* corresponding to the drive LBA "Lc" is saved in the physical address "Pk" (S204).

The logs 530 are stored in order in respective log regions 0 to m as the translation information (cache) 510*b* corresponding to each namespace is saved. The logs 530 are stored in respective log regions 0 to m chronologically from the oldest log to the newest log. In each of log regions 0 to m, as previously described, the logs 530 of only the single namespace are stored and the logs 530 of a plurality of namespaces are not mixed in a single log region. The log 530, as will be described below, is used for the rebuilding of location information group 550 in the start-up process of the memory device 1.

For example, when the power supply to the memory device 1 is interrupted, not all logs 530 may be stored in a log region at one time. For example, the logs 530 may also be stored each time at which a total size of the logs 530 reaches a size of a single logical page as the translation information (cache) 510*b* is updated plural times. In this case, the CPU 40 needs to manage a state of each piece of translation information (cache) 510*b* regarding whether there is a change to be recorded in the log 530 or not, by adding a flag showing that state, for example.

Figure 9A:
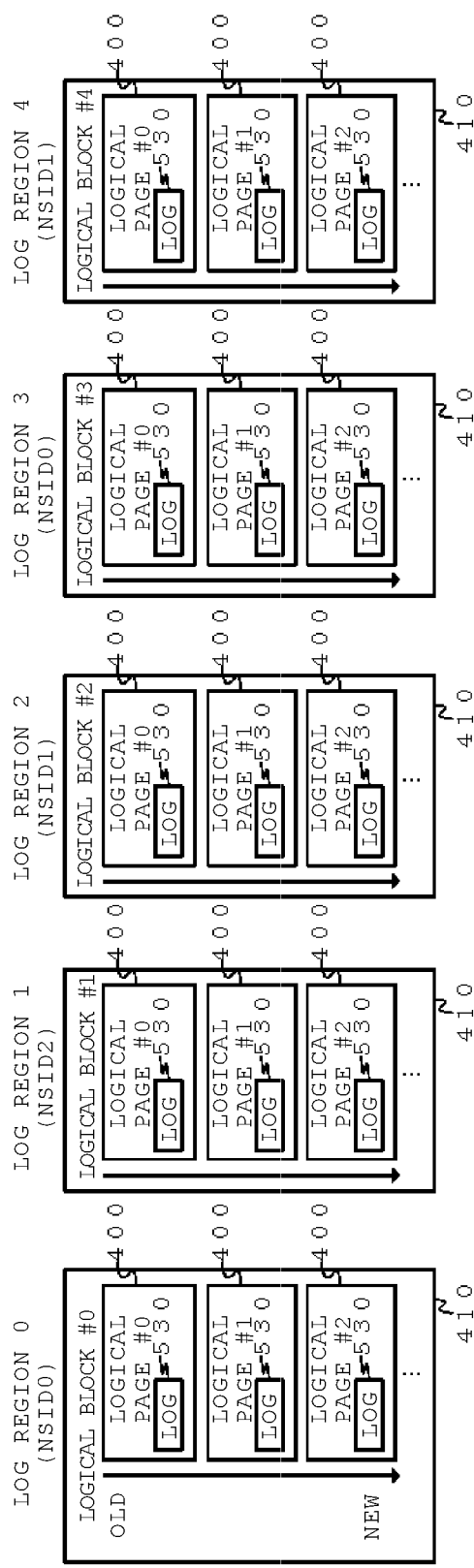
FIGS. 9A and 9B illustrate a first example of a log region allocation method according to the embodiment.

Next, an example of operations for allocating a single logical block 410 to a single log region will be described with reference to FIGS. 9A and 9B. A single log 530 of FIG. 9A indicates a set of the logs 530 amounting to a single logical page.

The logs 530 are stored for each namespace in units of the logical block 410 and in order of the logical page 400 of each logical block 410. In FIG. 9A, a logical block #0 is allocated as a log region 0 and the log 530 of NSID0 is stored in the logical block #0. A logical block #1 is allocated as a log region 1 and the log 530 of NSID2 is stored in the logical block #1. Furthermore, the log 530 of NSID1 is stored in the logical block #2 as a log region 2, the log 530 of NSID0 is stored in the logical block #3 as a log region 3, and the log 530 of NSID1 is stored in the logical block #4 as a log region 4.

Figure 9B:
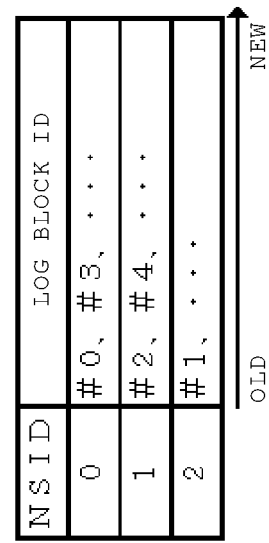

As a result, as illustrated in FIG. 9B, IDs (log block IDs) of the logical block 410 storing the log 530 of NSID0 are set as #0 and #3, and the log block IDs of NSID1 are set as #2 and #4, and the log block ID of NSID2 is set as #1, respectively.

Figure 10A:
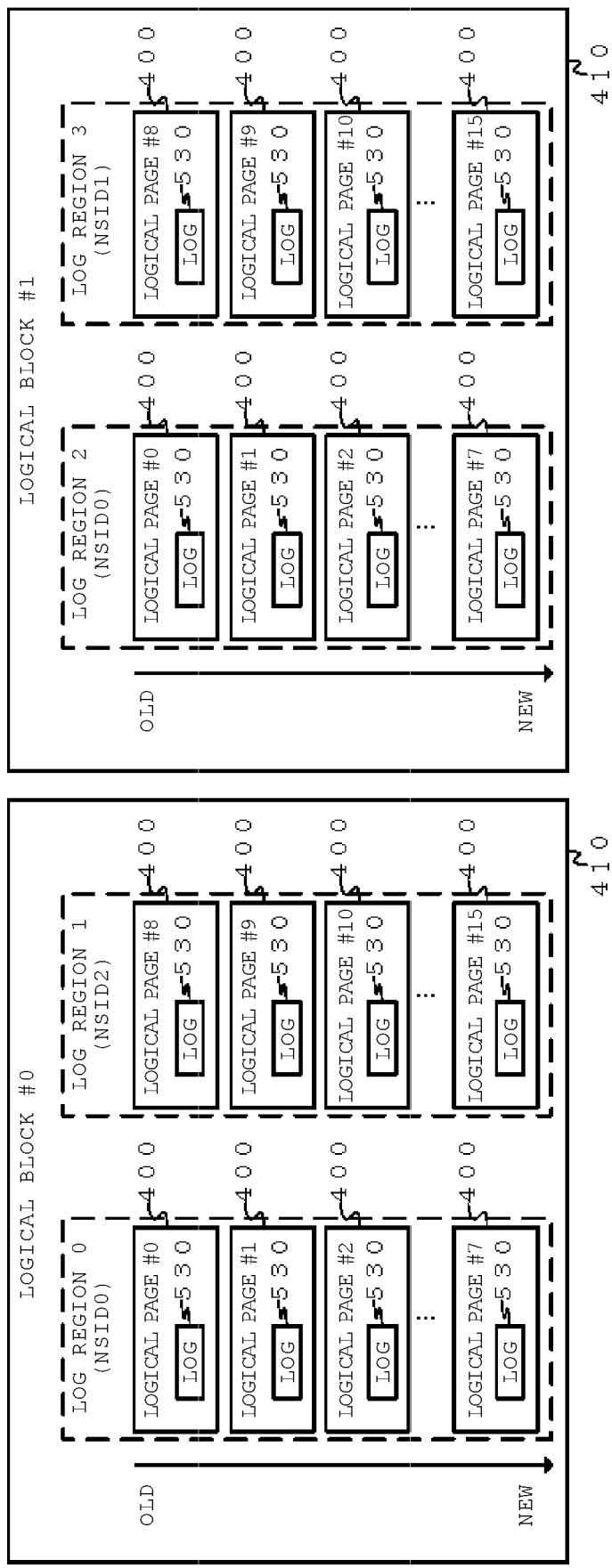

Next, an example of operations for dividing a single logical block 410 into a plurality of regions and allocating each divided region to a single log region will be described with reference to FIGS. 10A and 10B. In FIG. 10A, a single log 530 indicates a set of the logs 530 amounting to a size of a single logical page, similarly to FIG. 9A.

Every eight logical pages 400 of each logical block 410 is allocated as a single log region. In the following, a set of the logical page #0 to the logical page #7 is referred to as a Lower Page, and a set of the logical page #8 to the logical page #15 is referred to as an Upper Page. The number of logical pages 400 capable of being allocated as a single log region is not limited to 8 logical pages.

In FIG. 10A, the Lower Page of logical block #0 is allocated as a log region 0 and the logs 530 of NSID0 are stored in the log region 0. The Upper Page of logical block #0 is allocated as a log region 1 and the logs 530 of NSID2 are stored in the log region 1. The Lower Page of logical block #1 is allocated as a log region 2 and the logs 530 of NSID0 are stored in the log region 2. The Upper Page of logical block #1 is allocated as a log region 3 and the logs 530 of NSID1 are stored in the log region 3.

Figure 10B:
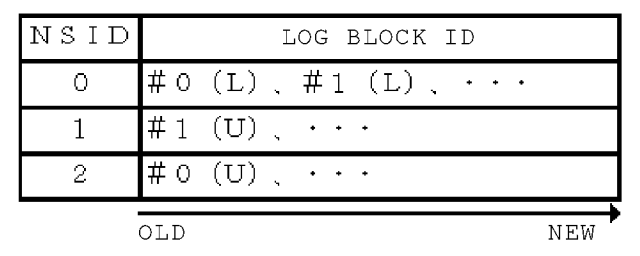

As a result, as illustrated in FIG. 10B, IDs (log block IDs) of the logical block 410 storing the log 530 of NSID0 are set as #0(L) and #1(L), the log block IDs of NSID1 and NSID2 are set as #1(U) and #0(U), respectively.

Figure 11A:
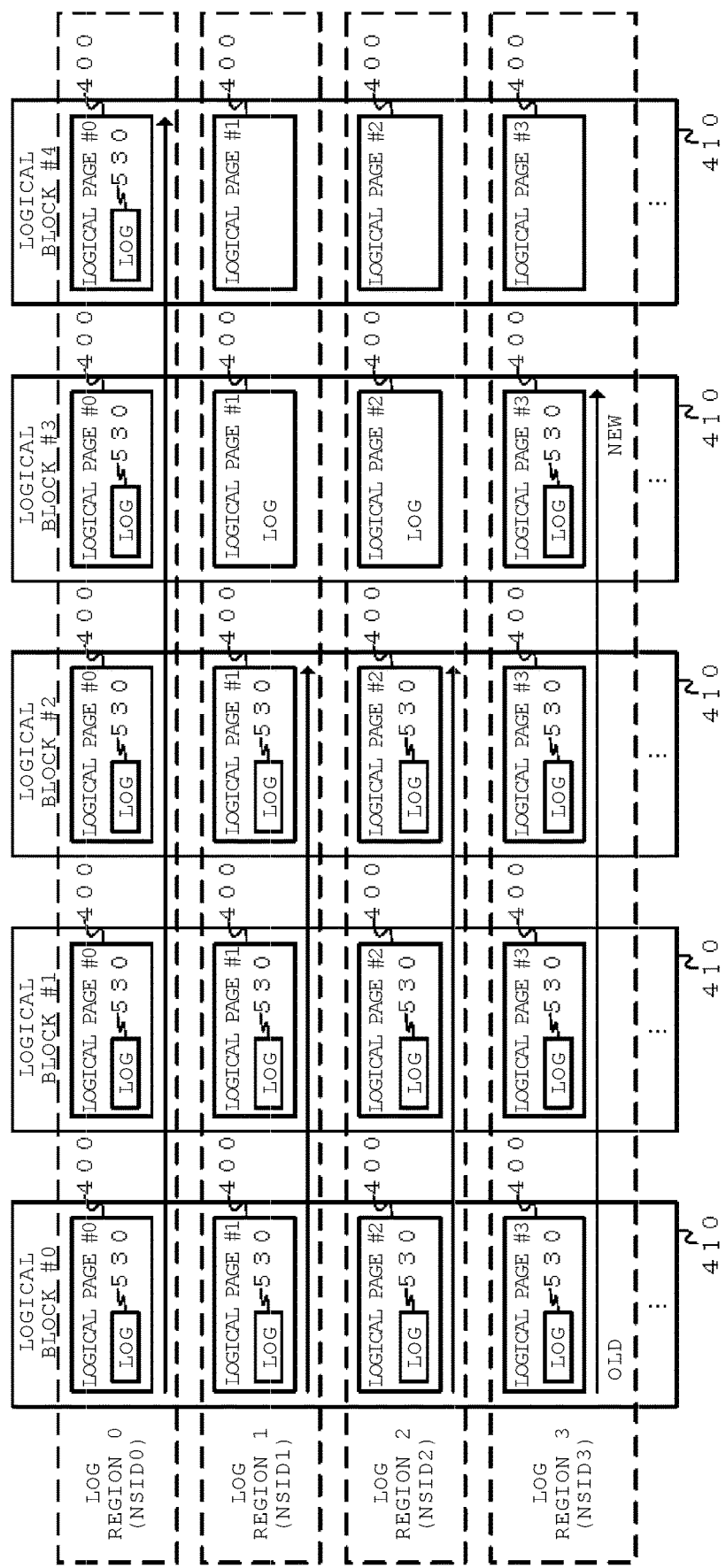
FIGS. 11A and 11B illustrate a third example of the log region allocation method according to the embodiment.

Next, an example of operations for allocating a set of single logical pages 400 each from respective logical blocks as a single log region of a namespace will be described with reference to FIGS. 11A and 11B. In FIG. 11A, a single log 530 indicates a set of logs 530 amounting to a size of a single logical page, similarly to FIG. 9A.

The log 530 is stored in the logical page 400 having a fixed location (ID) in each logical block 410 for each namespace. For example, a set of logical pages #0 of each logical block 410 is allocated as a log region 0 to be used for storing the log 530 of NSID0. A set of logical pages #1 of each logical block 410 is allocated as a log region 1 to be used for storing the log 530 of NSID1. A set of logical pages #2 of each logical block 410 is allocated as a log region 2 to be used for storing the log 530 of NSID2 and a set of logical pages #3 of each logical block 410 is allocated as a log region 3 to be used for storing the log 530 of NSID3.

In FIG. 11A, the log 530 of NSID0 is stored in the logical page #0 of the logical blocks #0 to #4, the log 530 of NSID1 is stored in the logical page #1 of the logical blocks #0 to #2, the log 530 of NSID2 is stored in the logical page #2 of the logical blocks #0 to #2, and the log 530 of NSID3 is stored in the logical page #3 of the logical blocks #0 to #3, respectively.

Figure 11B:

As a result, as illustrated in FIG. 11B, IDs (log block IDs) of the logical blocks 410 storing the log 530 of NSID0 are set as #0 to #4, the log block IDs of NSID1 are set as #0 to #2, the log block IDs of NSID2 are set as #0 to #2, and the log block IDs of NSID3 are set as #0 to #3, respectively.

In the above description, although a set of single logical pages 400 each from a logical block 410 is allocated as a single log region, a set of multiple logical pages 400 from respective logical blocks 410 may also be allocated as a single log region. For example, a set of logical pages #0 and logical pages #1 of each logical block 410 may also be allocated as a log region 0 to be used for storing the log 530 of NSID0. Similarly, a set of logical pages #2 and logical pages #3 of each logical block 410 may be allocated as a log region 1 to be used for storing the log 530 of NSID1, and a set of logical pages #4 and logical pages #5 of each logical block 410 may be allocated as a log region 2 to be used for storing the log 530 of NSID2.

Figures 12A, 12B:
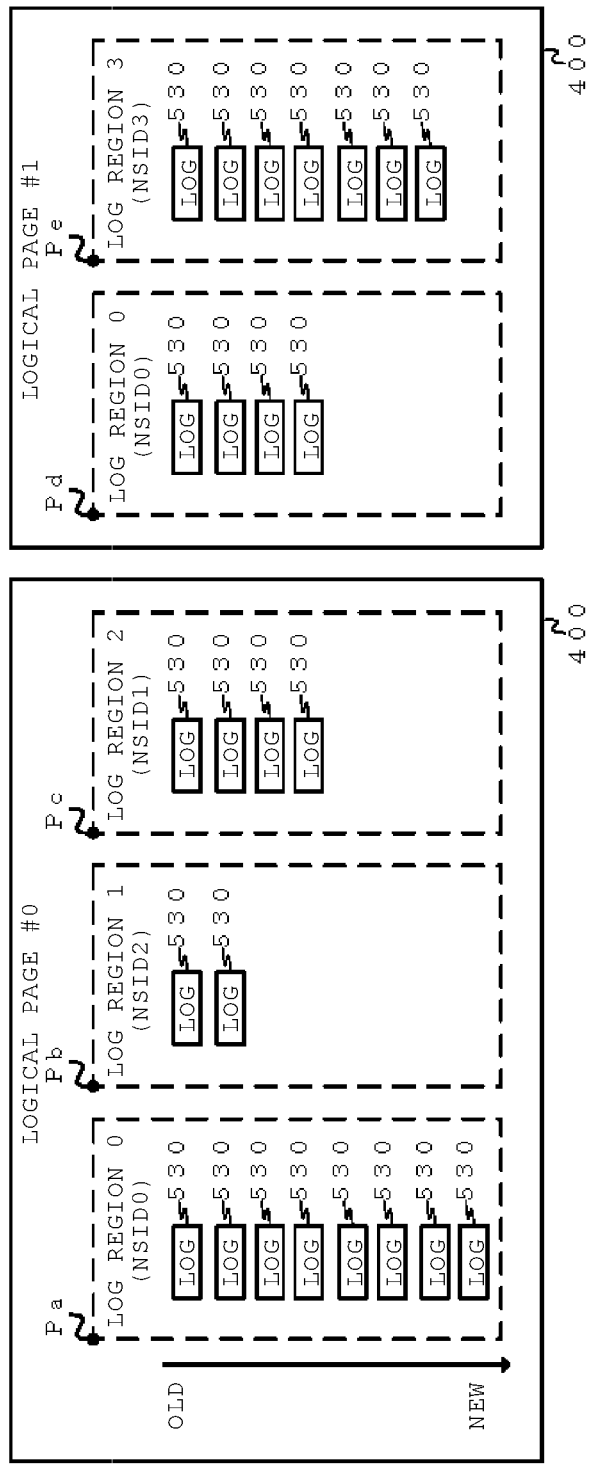
FIGS. 12A and 12B illustrate a fourth example of the log region allocation method according to the embodiment.

Next, an example of operations for dividing a single logical page 400 into a plurality of regions and allocating each divided region to a single log region will be described with reference to FIGS. 12A and 12B. In FIG. 12A, a single log 530 does not indicate a set of the logs 530. Here, it is assumed that each logical page 400 is able to store 16 logs 530 at a maximum.

In FIG. 12A, a region starting at an address Pa of the logical page #0 is allocated as a log region 0, and 8 logs 530 of NSID0 are stored in the log region 0. A region starting at an address Pb of the logical page #0 is allocated as a log region 1, and two logs 530 of NSID2 are stored in the log region 1. A region starting at an address Pc of the logical page #0 is allocated as a log region 2, and 4 logs 530 of NSID1 are stored in the log region 2.

A region starting at an address Pd of the logical page #1 is allocated as log regions 0, and 4 logs 530 of NSID0 are stored in the log region 0. A region starting at an address Pe of the logical page #1 is allocated as log regions 3, and 7 logs 530 of NSID3 are stored in the log region 3.

As a result, as illustrated in FIG. 12B, IDs (log page IDs) of the logical page 400 storing the log 530 of NSID0 are set as #0 (start address=Pa and length=8) and #1 (start address=Pd and length=4), a log page ID of NSID1 is set as #0 (start address=Pc and length=4), a log page ID of NSID2 is set as #0 (start address=Pb and length=2), and a log page ID of NSID3 is set as #1 (start address=Pe and length=7), respectively. Pieces of information of the start address and the length of each log region illustrated in FIG. 12B may also be stored in the logical page 400 as header information.

The above description involves the operation for dividing the log region of each logical page 400 into a plurality of sub-regions and storing a log 530 of each namespace in each of the plurality of sub-regions. In contrast, in storing user data 500, a user data region of each logical page 400 may be divided into a plurality of regions and the user data 500 of each namespace may be stored in each of the plurality of regions, and pieces of user data 500 of a plurality of namespaces may also be stored in a single user data region of the logical page 400.

Next, a configuration of the NS management table 540 will be described with reference to FIG. 13.

In the NS management table 540, a physical address of the RAM 30 in which the location information group 550 is stored, IDs (log block IDs) of the logical blocks 410 in which the logs 530 are stored, and a start-up priority, which will be described below, are recorded for each namespace.

Although the NS management table 540 is stored in the NAND flash memory 20 while power for operating the memory device 1 is not supplied, the NS management table 540 is copied to the RAM 30 or a memory region (not illustrated) within the CPU 40 or the controller 10 prior to another piece of information after power is supplied to the memory device 1.

In the case where the logical page 400 having a fixed location (ID) in of the logical block 410 as illustrated in FIG. 11A is allocated as a log region, the logical page ID storing the log 530 may not be recorded in the NS management table 540 when a logical page ID allocated as the log region is fixed for each namespace.

In the case where the log region is allocated as illustrated in FIG. 12, the log page ID is stored but the log block ID is not stored in the NS management table 540. Instead, in the case where the header information is stored in the logical page 400, the log block ID may be recorded in the NS management table 540. In this case, the CPU 40 can determine, upon reading the log 530, which address of each logical block 410 stores the log 530 of which namespace, by referring to the header information.

Next, operations of rebuilding a location information group 550 in the start-up process of the memory device 1 will be described with reference to FIG. 14. (which specifies a Function Level Reset (FLR) mechanism; the FLR mechanism enables software to quiesce and reset hardware with function-level granularity)

In the start-up process of the memory device 1, the CPU 40 obtains the start-up priority from the NS management table 540 and reads (replays) the log 530 according to the log block ID of the namespace to rebuild location information group of the namespace having the highest start-up priority (in particular, start-up priority value which is 1). This rebuilding process is carried out for one namespace after another, in ascending order of start-up priority values. As described above, the log 530 is stored in saving order of translation information (cache) 510b. For that reason, by reading the log 530 in saving order of the log 530, the latest location information 560 corresponding to a part of the drive LBAs can be found.

Figure 14:
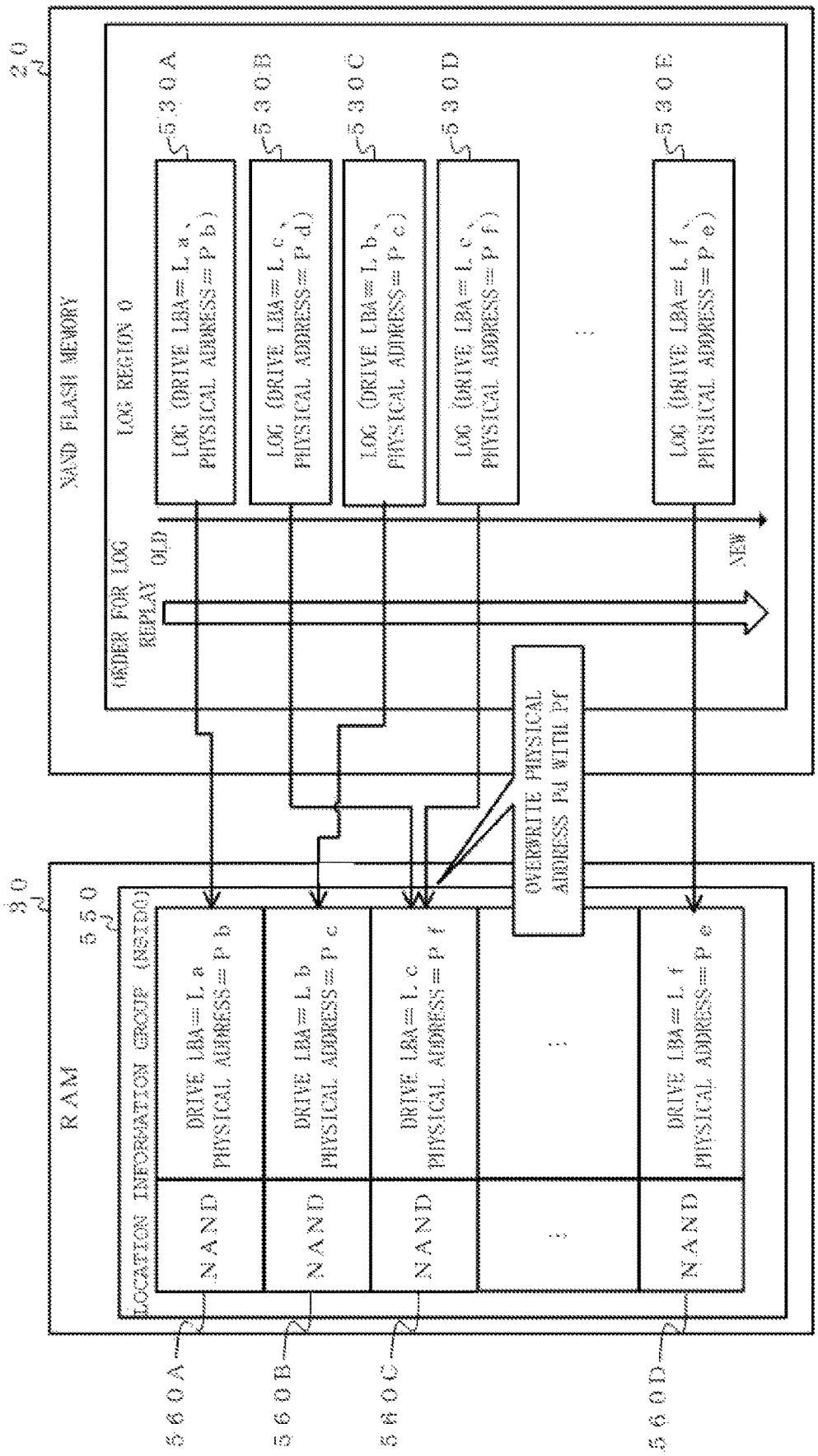
FIG. 14 illustrates an operation of rebuilding location information in the embodiment.

In FIG. 14, the CPU 40 reads (replays) the log 530 in the log region 0 in saving order of the log 530 and restores the physical address "Pb", as location information 560A, from a log 530A corresponding to the drive LBA "La". The CPU 40 restores the physical address "Pd", as location information 560C, from a log 530B corresponding to the drive LBA "Lc". The location information 560C will be overwritten by an operation to be performed later, as will be described later. Next, the physical address "Pc" is restored, as location information 560D, from a log 530C corresponding to the drive LBA "Lb". The physical address "Pf" corresponding to the drive LBA "Lc" is recorded in a log 530D (not shown) to be read next. In this case, in the location information 560C, the physical address "Pd" is overwritten with the physical address "Pf". The physical address "Pe" corresponding to the drive LBA "Lf" is recorded in a log 530E. Location information 560D is restored as the physical address "Pe".

At that time, each piece of translation information 510 is not yet copied from the NAND flash memory 20 to the RAM 30. For that reason, a region where each piece of translation information 510 is stored for each piece of rebuilt location information 560 is the NAND flash memory 20.

Even by reading (replaying) the logs 530 in reverse order of storing, latest location information 560 corresponding to a part of the drive LBA space can be rebuilt. In this case, after reading (replaying) a physical address recorded in the latest log 530 (which is read first) into the location information 560 for a drive LBA, physical addresses recorded in older logs 530, which correspond to the same drive LBA, are ignored. In FIG. 14, the log 530D is read first and the log 530B is read thereafter in the log 530 corresponding to the drive LBA "Lc". In the location information 560C, the physical address "Pf" recorded in the log 530D is reflected and the physical address "Pd" recorded in the log 530B is not reflected.

When a log region is not managed for each namespace separately, the CPU 40 determines whether or not the log 530 corresponds to one of namespaces based on the NSID included in the log 530. In this case, when the read log 530 corresponds to a namespace to be restored, the CPU 40 uses the log 530 for rebuilding the location information group 550. On the other hand, when the read log 530 does not correspond to the namespace to be restored, the CPU 40 skips the log 530 and proceeds to read the next log 530.

In the present embodiment, the location information group 550 is rebuilt for each namespace according to the start-up priority of the NS management table 540. That is, the CPU 40 rebuilds the location information group 550 of a namespace having the highest start-up priority first upon start-up of the memory device 1. When the rebuilding for the namespace with the highest start-up priority is completed, the CPU 40 sequentially starts rebuilding of the location information groups 550 of the namespace having the next highest start-up priority.

When rebuilding of the location information group 550 of a certain namespace is completed, i.e., when all logs 530 of the namespace have been replayed, the namespace becomes ready for reading and writing of user data 500. That is, in the present embodiment, when rebuilding of the location information group 550 is completed, starting of the namespace is completed. Thus, each log 530 may be considered as start-up information of the namespace.

When the translation information 510 is saved in the NAND flash memory 20, the translation information 510 may be separately saved for each namespace. In this case, when the location information group 550 of a certain namespace is rebuilt and copying of translation information 510 of the namespace to the RAM 30 is completed in the start-up process of the memory device 1, then the start-up process of the namespace is completed.

Figure 15:
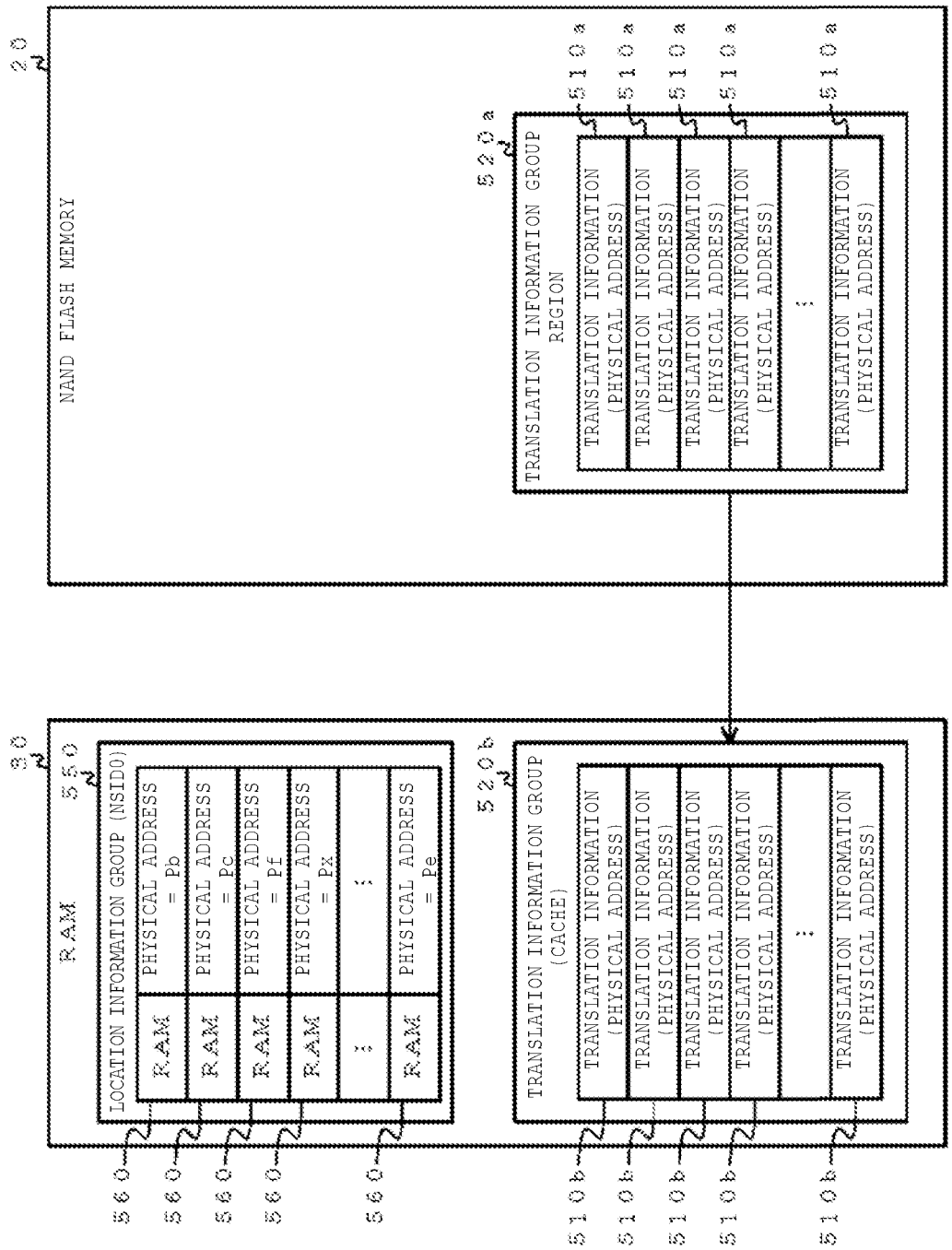
FIG. 15 illustrates an operation of caching translation information into an RAM in the embodiment.

Next, an operation of caching the translation information 510 to the RAM 30 will be described with reference to FIG. 15.

In the present embodiment, the translation information 510a is copied, as the translation information (cache) 510b, from the NAND flash memory 20 to the RAM 30 after rebuilding of the location information group 550 is completed for all namespaces. As the translation information has been copied to the RAM 30, the location information 560 corresponding to the translation information now points to the RAM 30.

The translation information 510 may be copied to the RAM 30 after rebuilding of the location information groups 550 of the entire memory device is completed. Instead, translation information 510 of a certain namespace may be copied to the RAM 30 each time when rebuilding of the location information group 550 of the namespace is completed.

Next, an example of reporting completion of start-up process to the host 2 will be described with reference to FIG. 16a to FIG. 16c.

Among start-up priorities recorded in the NS management table 540, as illustrated in FIG. 16A, the NSID0 is the third place, the NSID1 is the second place, the NSID2 is the first place, and the NSID3 is the fourth place.

In FIG. 16B, when power begins being supplied to the memory device 1, rebuilding of the location information group 550 of NSID2 of which start-up priority is the first place is started. When the rebuilding of the location information group 550 of NSID2 is completed, the memory device 1 reports to the host 2 that start-up of the NSID2 is completed. Thereafter, according to start-up priority of the NS management table 540, the rebuilding of the location information group 550 of NSID1 and reporting of the completion of start-up of the NSID1 to the host 2, the rebuilding of the location information group 550 of NSID0 and reporting of the completion of start-up of the NSID0 to the host 2, and the rebuilding of the location information group 550 of NSID3 and reporting of the completion of start-up of the NSID3 to the host 2 are performed in this order. When the rebuilding of the location information groups 550 for all namespaces is completed, it is reported to the host 2 that start-up of the memory device 1 is completed.

In FIG. 16B, the memory device 1 reports the completion of start-up of the namespace to the host 2 as the rebuilding of the location information groups 550 of each namespace is completed.

In contrast, in FIG. 16C, the memory device 1 answers whether or not the start-up is completed, as a response to an inquiry command from the host 2.

That is, as illustrated in FIG. 16C, the rebuilding of the location information group 550 of NSID2, which has the start-up priority of the first place, is started as power begins being supplied to the memory device 1. When a command to inquire whether or not start-up of the NSID2 is completed, is received from the host 2 before the rebuilding of the location information group 550 of NSID2 is completed, the memory device 1 answers that the start-up process is not completed. During the rebuilding of the location information group 550 of NSID2, when a command to inquire whether or not start-up of the NSID0, for which the rebuilding of the location information group 550 is not started, is completed, is received, the memory device 1 similarly answers that the start-up is not completed. When a command to inquire whether or not start-up of the NSID2 is completed is received after the rebuilding of the location information group 550 of NSID2 is completed, the memory device 1 answers that the start-up is completed. In this example, when the rebuilding of the location information group 550 of a single namespace is completed, the memory device 1 starts the rebuilding of the location information group 550 of a namespace having the next highest start-up priority. When the rebuilding of the location information groups 550 for all namespaces is completed, it is reported to the host 2 that the start-up process of the memory device 1 is completed.

Figure 17:
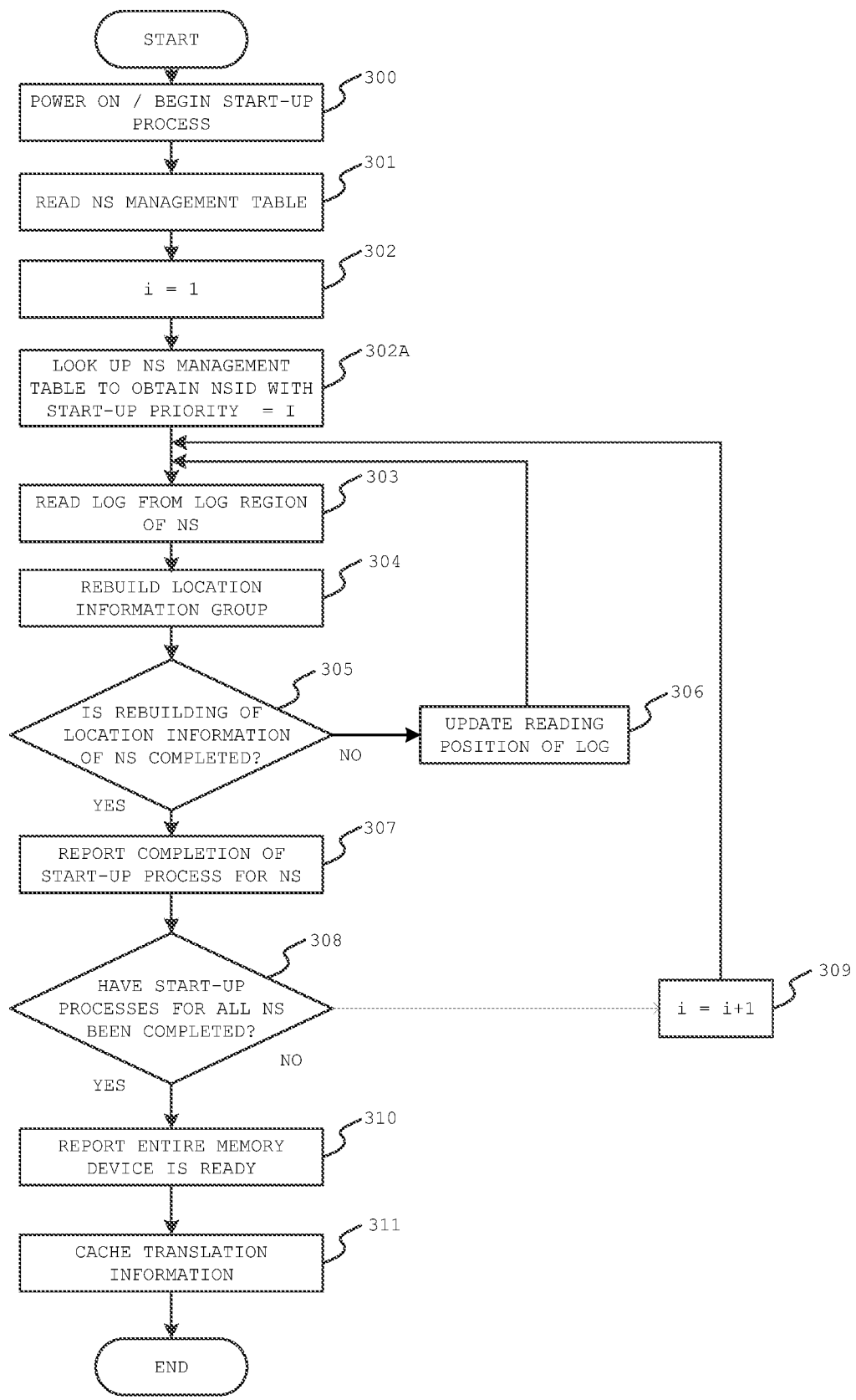
FIG. 17 is a flowchart for explaining start-up process of the memory device realized by firmware according to the embodiment.

Next, control according to FW in the start-up process of the memory device 1 will be described with reference to FIG. 17.

First, the CPU 40 reads the NS management table 540 from NAND flash memory 20 (S301) when power begins being supplied to the memory device 1 (S300). Next, the CPU 40 initializes a variable i indicating a start-up priority to be set as 1 (S302), reads (replays) the log 530 from a log region of a namespace having the highest the start-up priority (that is, i=1) according to the start-up priority of the NS management table 540 (S303), and rebuilds the location information group 550 on the RAM 30 (S304). The CPU 40 updates a reading position of the log 530 (S306) and repeats reading (replaying) of the log 530 and restoring to the RAM 30 (S303 to S306) until the rebuilding of the location information group 550 of the namespace is completed (S305: No). A rebuilding of a namespace is determined to be completed when all the logs 530 of the namespace have been replayed.

When the rebuilding of the location information group 550 of the namespace is completed (S305: Yes), the CPU 40 instructs the host IF control unit 200 to report (notify) the completion of start-up process of the namespace to the host 2 (S307).

When start-up process of all namespaces is not completed (i.e., there is a namespace which start-up process is not completed) (S308: No), the CPU 40 increments the variable indicating the start-up priority (S309), reads (replays) the log 530 from a log region of the namespace having the start-up priority of i (S303), and rebuilds the location information group 550 on the RAM 30 (S304).

When start-up process of all namespaces is completed (S308: Yes), the CPU 40 instructs the host IF control unit 200 to report (notify) the completion of start-up process of the memory device 1 to the host 2 (S310).

Thereafter, the translation information 510 is cached from the NAND flash memory 20 to the RAM 30 (S311). In another embodiment, caching the translation information 510 to the RAM (S311) for a namespace can be carried out in parallel to rebuilding location information group 550 of another namespace (steps S303-S307), after completing the rebuilding of the namespace.

Next, an example of operations of a command to designate the start-up priority will be described with reference to FIGS. 18A and 18B.

FIG. 18A illustrates an example of operations of a command to designate the start-up priority to an existing namespace. As illustrated in FIG. 18A, for example, the host 2 designates the start-up priority of the NSID2 as the first place. The memory device 1, which receives the command for designating the start-up priority, sets the start-up priority of the NSID2 of the NS management table 540 to the first place and then reports a normal completion to the host 2.

FIG. 18B is an example of operations of a command designating a start-up priority simultaneously with creation of a namespace in the present embodiment. As illustrated in FIG. 18A, for example, the host 2 requests the memory device to create a namespace with NSID=2 having the start-up priority of the first place. The memory device 1, which receives the command to create a namespace with NSID=2 (hereinafter, the NSID2), allocates a region for the NSID2 in a logical address space and reports a normal completion to the host 2 after setting the start-up priority of the NSID2 of the NS management table 540 to the first place.

When an operation requested by the host 2 cannot be performed or the operation fails for one of the commands described above, the memory device 1 reports an error to the host 2.

As having been described above, the host 2 designates the start-up priority of each namespace to the memory device 1 to designate a namespace intended to be used preferentially at starting of the memory device 1.

Figure 19B:
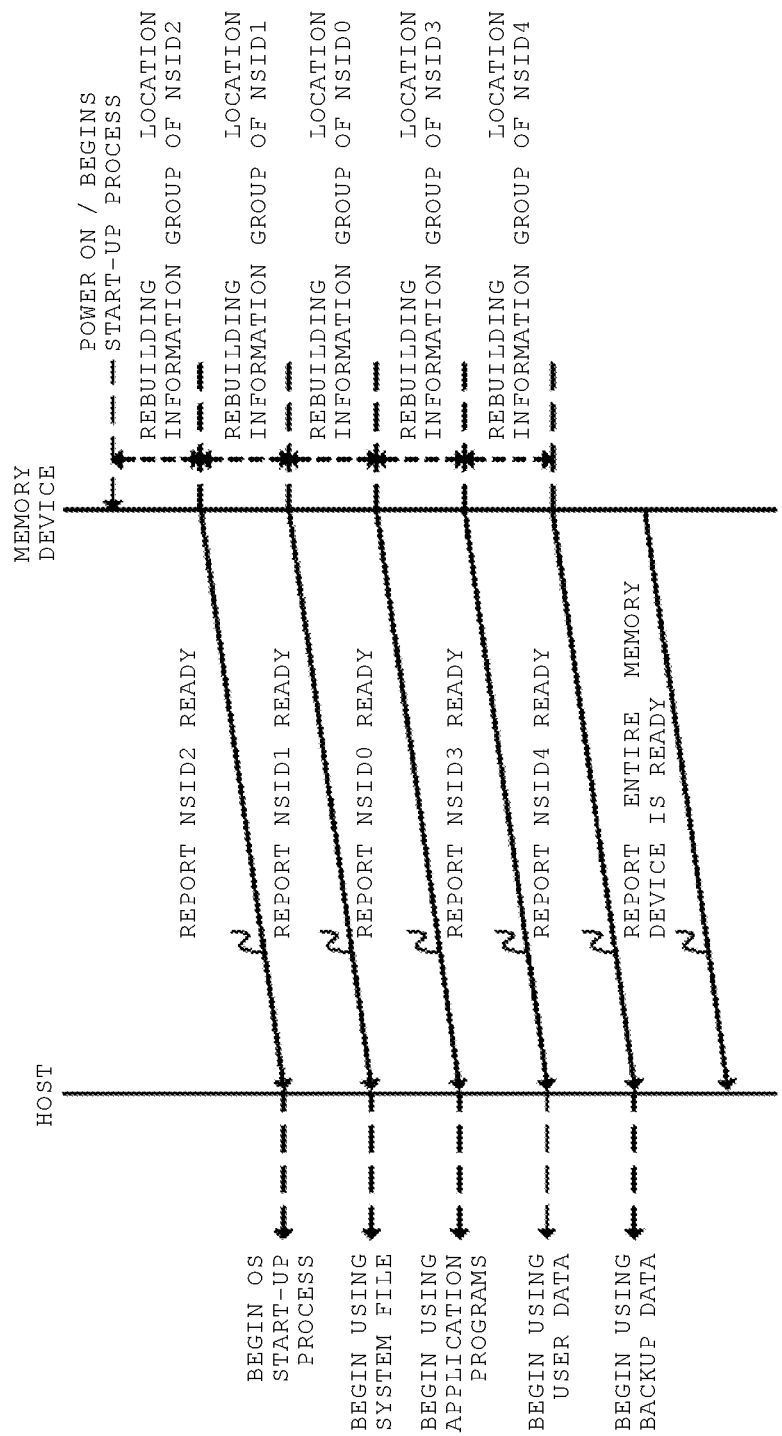

Next, an example of the start-up priority for each namespace, use-case for each namespace, and the start-up process completion report (notification) from the memory device 1 will be described with reference to FIGS. 19A and 19B.

The host 2 determines how to set a usage of each namespace and the start-up priority. The host 2 determines, for example, a usage of each namespace as (a) namespace storing a boot record and an OS kernel image, (b) namespace storing system files needed for starting the OS, (c) namespace storing application programs, (d) namespace storing user data, and (e) namespace storing backup data. The host 2 determines that the start-up priorities of the namespace are high in the order of (a), (b), (c), (d), and (e). The host 2 issues a command that designates the start-up priority to the memory device 1 to designate the start-up priority for each namespace.

In FIG. 19A, the start-up priority of the NSID0 is set as the third place and the NSID0 is used for storing the application programs. The start-up priority of the NSID1 is set as the second place and the NSID1 is used for storing the system files. The start-up priority of the NSID2 is set as the first place and the NSID2 is used for storing the boot record and the OS kernel image. The start-up priority of the NSID3 is set as the fourth place and the NSID3 is used for storing the user data. The start-up priority of the NSID4 is set as the fifth place and the NSID4 is used for storing the backup data.

By configuring the namespaces as described above, the host 2 is able to begin starting up the OS prior to start-up of other namespaces (user data etc.) in the memory device 1. That is, as illustrated in FIG. 19B, the host 2 receives a start-up process completion report of the NSID2 of which start-up priority is the first place and then begins OS start up process. The host 2 receives a start-up process completion report of the NSID1 of which start-up priority is the second place and then begins using the system files. The host 2 receives a start-up process completion report of the NSID0 of which start-up priority is the third place and then begins using the application programs. As a result, a start-up time of the system can be reduced compared to a system in which the host 2 waits for completion of the start-up of the entire memory device 1 and then begins the OS start-up process.

In addition, it is possible to preferentially start a namespace in which user data intended to be used preferentially at starting of the system. In FIG. 19B, the host 2 receives the start-up process completion report of the NSID3 of which start-up priority is the fourth place and then begins using the user data. Then, the host 2 receives the start-up process completion report of the NSID4 of which start-up priority is the fifth place and then begins using the backup data.

Figure 20B:
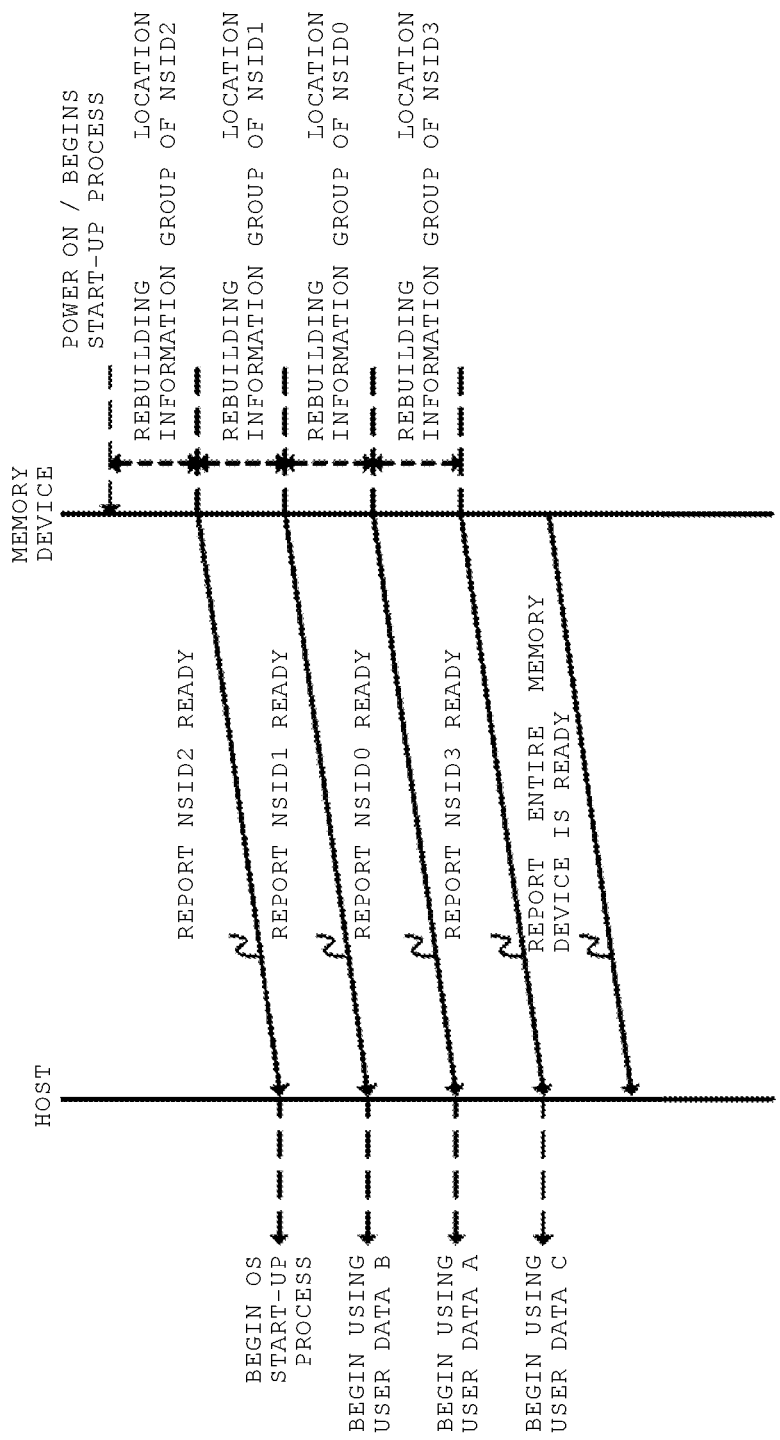

Next, another example of the start-up priority for each namespace, usage for each namespace, and the start-up process completion report from the memory device 1 will be described with reference to FIGS. 20A and 20B.

In FIG. 20A, the start-up priority of the NSID0 is set as the third place and the NSID0 is used for storing user data A. The start-up priority of the NSID1 is set as the second place and the NSID1 is used for storing user data B. The start-up priority of the NSID2 is set as the first place and the NSID2 is used for storing an operating system (OS). The start-up priority of the NSID3 is set as the fourth place and the NSID3 is used for storing user data C.

The user data A to user data C correspond to, for example, virtual machine images of a plurality of users. The user data B correspond to, for example, data used by all users. The user data A corresponds to data used by, for example, a user who makes a license contract which has a high priority level. The user data C corresponds to data used by, for example, a user who makes a license contract which has a low priority level.

By configuring the namespaces as described above, the host 2 is able to begin using a namespace as sooner after starting of the system, as higher the priority of the namespace. In FIG. 20B, the host 2 receives the start-up process completion report of the NSID1 of which start-up priority is the second place and then begins using the user data B. The host 2 receives the start-up process completion report of the NSID0 of which start-up priority is the third place and then begins using the user data A. The host 2 receives the start-up process completion report of the NSID3 of which start-up priority is the fourth place and then begins using the user data C.

Next, an example of operations when there is overlap of two or more start-up priorities designated by a command will be described with reference to FIG. 21A to FIG. 21C.

As illustrated in FIG. 21B, for example, among the start-up priorities recorded in the NS management table 540, the start-up priority of the NSID0 is the third place, the start-up priority of the NSID1 is the second place, the start-up priority of the NSID2 is the first place, the start-up priority of the NSID3 is the fourth place, and the start-up priority of the NSID4 is the fifth place.

In this state, it is assumed that the host 2 designates the start-up priority of the NSID4 as the third place through the command (command in FIG. 18A) designating the start-up priority for the existing namespace. However, in this case, the third place of the start-up priority has already been allocated to the NSID0. In such a case, the memory device 1, first, sets the start-up priority (third place) designated with the command as NSID4. Among existing namespaces, the start-up priority of the namespace, which is not designated with the command and has the start-up priority more than or equal to the start-up priority (third place) designated with the command, is incremented by 1. That is, a start-up priority of the NSID0 of which start-up priority is the third place is set as the fourth place and a start-up priority of the NSID3 of which start-up priority is the fourth place is set as the fifth place. When setting of the start-up priorities of respective namespaces are completed, the memory device 1 reports the normal completion of the command to the host 2.

The NS management table 540 becomes a state illustrated in FIG. 21C after completing operations required by the command. That is, the NSID0 becomes the fourth place, the NSID1 becomes the second place, the NSID2 becomes the first place, the NSID3 becomes the fifth place, and the NSID4 becomes the third place.

Next, another example of operations when there is overlap of two or more start-up priorities designated by a command will be described with reference to FIG. 22A to FIG. 22C. Here, description will be made on an example of operations when a command (command of FIG. 18B) to create a namespace associated with a start-up priority is received. FIG. 22B illustrating a state of the NS management table 540 before receiving the command is as illustrated in FIG. 21B.

While the host 2 requests to create a namespace with NSID=5 (the NSID5) of which start-up priority is the third place through the command designating a start-up priority simultaneously with creation of a namespace, the third place of the start-up priority has already been allocated to the NSID0. In such a case, the memory device 1, first, sets the start-up priority (third place) designated with the command as NSID5. Among existing namespaces, the start-up priority of the namespace, which is not designated with the command and has the start-up priority more than or equal to the start-up priority (third place) designated with the command, is incremented by 1. That is, a start-up priority of the NSID0 of which start-up priority is the third place is set as the fourth place, a start-up priority of the NSID3 of which start-up priority is the fourth place is set as the fifth place, and a start-up priority of the NSID4 of which start-up priority is the fifth place is set as the sixth place. When creating the NSID5 and setting of the start-up priorities of respective namespaces are completed, the memory device 1 reports the normal completion of the command to the host 2.

The NS management table 540 becomes a state illustrated in FIG. 22C, after completing operations requested by the command. That is, the NSID0 becomes the fourth place, the NSID1 becomes the second place, the NSID2 becomes the first place, the NSID3 becomes the fifth place, the NSID4 becomes the sixth place, and the NSID5 becomes the third place.

When the memory device 1 is not able to perform an operation requested by the host 2 or the operation fails, especially, overlap of the start-up priorities is not allowed, even for one of cases of FIGS. 21A to 21C and FIGS. 22A to 22C, the memory device 1 may report an error to the host 2.

When the start-up priority designated by the command is reflected into the NS management table 540 and as a result, discontinuity may be generated in the start-up priorities recorded in the NS management table 540, the memory device 1 may change the start-up priorities such that the start-up priorities are continuous. For example, when the start-up priority designated with the command is reflected into the NS management table 540 and as a result, the start-up priorities recorded in the NS management table 540 becomes the first place, the second place, the fourth place in sequence, the memory device 1 may also rewrite the NS management table 540 to change the start-up priorities to be the first place, the second place, and the third place in sequence.

Figure 23:
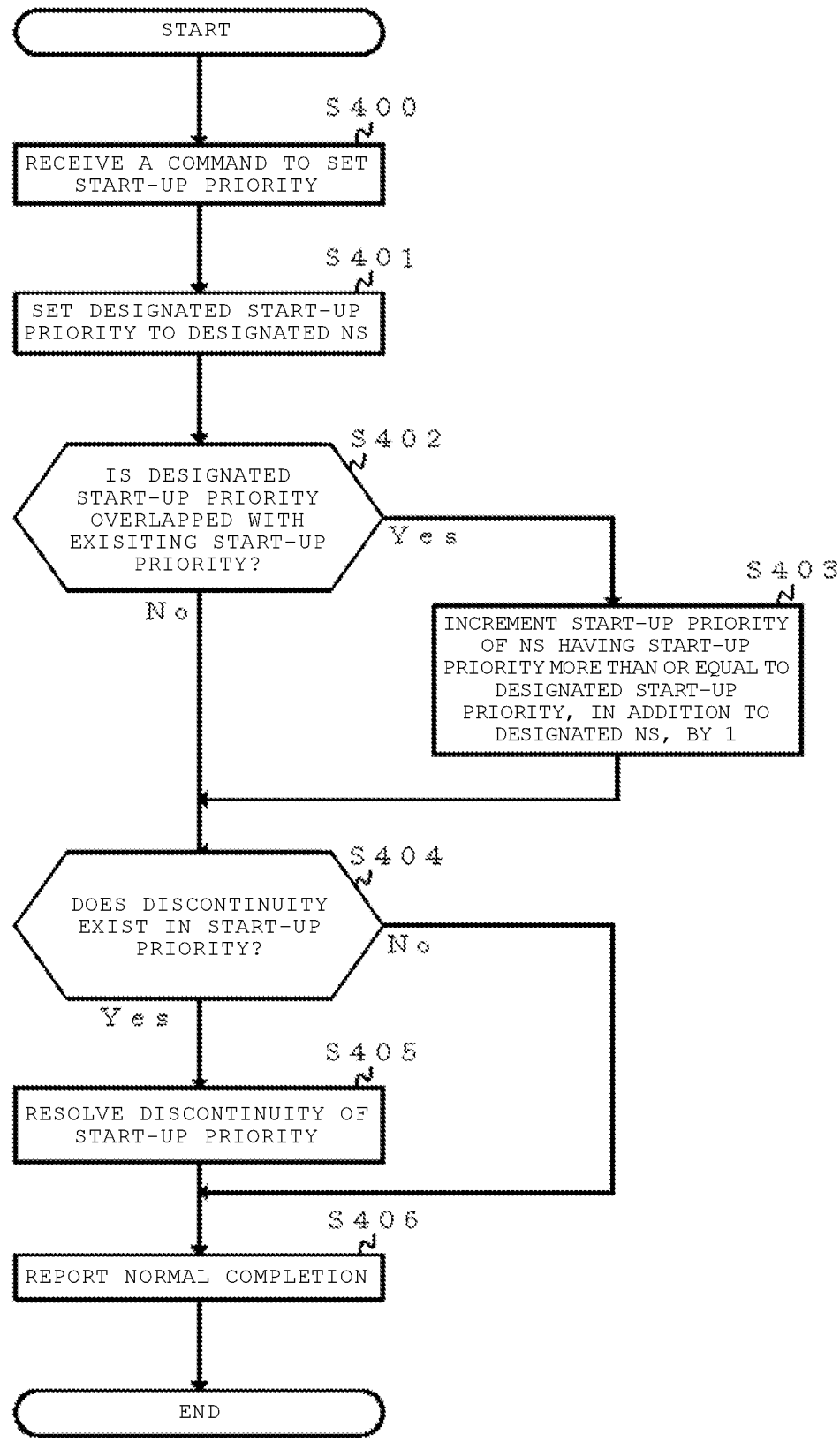
FIG. 23 is a flowchart of handling a start-up priority designation command realized by firmware in the embodiment.

Next, control according to FW when a command designating a start-up priority is received will be described with reference to FIG. 23.

When the command designating a start-up priority is received (S400), the CPU 40 sets the start-up priority designated by the command to the namespace (designated namespace) designated by the command (S401). Next, the CPU 40 checks whether or not the designated start-up priority is overlapped with existing start-up priorities (S402).

When the designated start-up priority is redundant with one of the existing start-up priorities (S402: Yes), the start-up priority of a namespace which is other than the designated namespace and has the start-up priority more than or equal to the start-up priority designated by the command is incremented by 1 (S403).

Next, the CPU 40 checks whether or not discontinuity exists in the start-up priorities recorded in the NS management table 540 (S404). If discontinuity exists in the start-up priorities (S404: Yes), the CPU 40 may change the start-up priorities in order to resolve the discontinuity (S405).

When setting of the start-up priorities is completed for all namespaces by the step of (S401), (S403), or (S405), the CPU 40 instructs the host IF control unit 200 to report the normal completion of the command to the host 2 (S406).

Next, an example of operations of a command which inquires the start-up priority will be described with reference to FIG. 24A to FIG. 24C.

As illustrated in FIG. 24A, for example, among the start-up priorities recorded in the NS management table 540, the start-up priority of the NSID0 is the third place, the start-up priority of the NSID1 is the second place, the start-up priority of the NSID2 is the first place, the start-up priority of the NSID3 is the fourth place, and the start-up priority of the NSID4 is the fifth place.

In FIG. 24B, the memory device 1 receives a command to inquire the start-up priority of the NSID3 from the host 2. The CPU 40 looks up the NS management table 540, acquires the start-up priority (fourth place) of the NSID3, and then, instructs the host IF control unit 200 to answer the fourth place as the start-up priority of the NSID3 to the host 2.

In FIG. 24C, the memory device 1 receives a command to inquire an ID of a namespace of which start-up priority is the fourth place from the host 2. The CPU 40 looks up the NS management table 540, acquires the ID of the namespace of which start-up priority is the fourth place, and then, instructs the host IF control unit 200 to answer "NSID3=3", as the ID of the namespace (NSID3) of which the start-up priority is the fourth place, to the host 2.

Either in the cases in FIGS. 24B and 24C, when the ID of the namespace or the start-up priority applicable for the inquiry from the host 2 is not recorded in the NS management table 540, the memory device 1 reports an error to the host 2.

According to the memory device of at least one of the embodiments described above, the host designates the start-up priority of each namespace and the memory device performs start-up process of one namespace after another in ascending order of start-up priority (i.e., the highest priority is the first to be started) so that the start-up time required for the system can be shortened.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device capable of communicating with a host device, comprising;
    a nonvolatile semiconductor memory; and
    a controller configured to perform, in response to commands from the host device, a read operation and a write operation on the nonvolatile semiconductor memory,
    wherein the controller is configured to:
        divide a logical address space of the storage device into a plurality of subspaces including a first subspace and a second subspace;
        receive, from the host device, a priority value for each of the first and second subspaces, the priority values of the first and second subspaces determining an order for starting up the first and second subspaces upon start-up of the storage device;
        manage the priority values of the first and second subspaces;
        store a plurality of pieces of first log data for the first subspace in a first area of the nonvolatile semiconductor memory in which a plurality of pieces of second log data for the second subspace is not stored, the first area starting at a first physical address, store the plurality of pieces of second log data for the second subspace in a second area of the nonvolatile semiconductor memory in which the plurality of pieces of first log data for the first subspace is not stored, the second area starting at a second physical address different from the first physical address, the plurality of pieces of first log data and the plurality of pieces of second log data being used for restoring logical-to-physical address conversion information of the corresponding one of the first and second subspaces, the logical-to-physical address conversion information being used for a conversion between a logical address and a physical address of the nonvolatile semiconductor memory;
        manage an association of a number of the plurality of pieces of first log data, the first physical address, and an identifier of the first subspace;
        manage an association of a number of the plurality of pieces of second log data, the second physical address, and an identifier of the second subspace; and
        upon the start-up of the storage device, start up the first and second subspaces by reading the plurality of pieces of first log data from the first physical address and the plurality of pieces of second log data from the second physical address according to the managed priority values of the first and second subspaces such that the logical-to-physical address conversion information of the first subspace is restored earlier than the logical-to-physical address conversion information of the second subspace in a case in which the priority value of the first subspace is higher than the priority value of the second subspace, wherein the controller is further configured to not allow the read operation or the write operation to one of the first and second subspaces to be processed until the restoring of the logical-to-physical address conversion information of the one of the first and second subspaces has completed.

2. The storage device according to claim 1, wherein the start-up of the storage device is performed in response to a power-on of the storage device.

3. The storage device according to claim 1,
    wherein the controller is further configured to store the priority values in the nonvolatile semiconductor memory in association with the identifiers of the first and second subspaces, and read the priority values from the nonvolatile semiconductor memory upon the start-up of the storage device.

4. The storage device according to claim 1,
    wherein the controller, in response to a first command received from the host device that designates an identifier of a third subspace and a priority value for the first subspace, stores the priority value for the third subspace in the nonvolatile semiconductor memory.

5. The storage device according to claim 4,
    wherein when the priority value for the third subspace designated in the first command overlaps with a priority value of another one of the subspaces,
    the controller stores the designated priority value in the nonvolatile semiconductor memory in association with the third subspace, and increments by 1, the priority values of other subspaces having a priority value that is greater than or equal to the designated priority value.

6. The storage device according to claim 1,
    wherein, upon the start-up of the storage device, the controller starts up the subspaces in an ascending order of the priority values of the first and second subspaces.

7. The storage device according to claim 6,
    wherein the controller is configured to send to the host device a completion report that the start-up of a subspace has completed before the start-up of the first and second subspaces has completed.

8. The storage device according to claim 7,
    wherein, in response to a second command received from the host device, the second command designating one of the first and second subspaces, the controller sends to the host device a report of whether or not the start-up of the one of the first and second subspaces designated in the second command has completed.

9. The storage device according to claim 1,
    wherein, in response to a third command received from the host device, the third command designating one of the first and second subspaces, the controller reports the priority value of the one of the subspaces designated in the third command.

10. The storage device according to claim 1,
    wherein, in response to a fourth command received from the host device, the fourth command designating a priority value, the controller reports information identifying a subspace corresponding to the priority value designated in the fourth command.

11. The storage device according to claim 1, wherein the controller is further configured to allow the read operation and the write operation to one of the first and second subspaces after the start-up of the one of the first and second subspaces has completed and prior to the start-up of all of the first and second subspaces has completed.

12. A method of controlling a storage device which is capable of communicating with a host device, the storage device including a nonvolatile semiconductor memory for storing data received from the host device, the storage device dividing a logical address space of the storage device into a plurality of subspaces including a first subspace and a second subspace, the method comprising:

receiving, from the host device, a first priority value for the first subspace and a second priority value for the second subspace, wherein the first and second priority values determine an order for starting up the subspaces upon start-up of the storage device, such that a read operation and a write operation to one of the first and second subspaces are not allowed to be processed until the start-up of the one of the first and second subspaces has completed, and the priority value for the first subspace is designated in a first command transmitted from the host device to the storage device;

managing the priority values for the first and second subspaces;

storing a plurality of pieces of first log data and second log data for the first subspace in a first area of the nonvolatile semiconductor memory in which a plurality of pieces of second log data for the second subspace is not stored, the first area starting at a first physical address, store the plurality of pieces of second log data for the second subspace in a second area of the nonvolatile semiconductor memory in which the plurality of pieces of first log data for the first subspace is not stored, the second area starting at a second physical address different from the first physical address, the plurality of pieces of first log data and the plurality of pieces of second log data being used for restoring logical-to-physical address conversion information of the corresponding one of the first and second subspaces, the logical-to-physical address conversion information being used for a conversion between a logical address and a physical address of the nonvolatile semiconductor memory; and upon the start-up of the storage device, starting up the first and second subspaces by reading the plurality of pieces of first log data from the first physical address and the plurality of pieces of second log data from the second physical address according to the managed priority values of the first and second subspaces such that the logical-to-physical address conversion information of the first subspace is restored earlier than the logical-to-physical address conversion information of the second subspace in a case in which the priority value of the first subspace is higher than the priority value of the second subspace, wherein the read operation or the write operation to one of the first and second subspaces is not allowed to be processed until the restoring of the logical-to-physical address conversion information of the one of the subspaces has completed.

13. The method according to claim 12, wherein the start-up of the storage device is performed in response to a power-on of the storage device.

14. The method according to claim 12, further comprising:

sending to the host device a completion report that the start-up of the first subspace has completed before the start-up of the second subspace has completed.

15. The method according to claim 12, further comprising:

in response to a second command received from the host device, the second command designating one of the first and second subspaces, sending to the host device a report of whether or not the start-up of the one of the first and second subspaces designated in the second command has completed.

16. The method according to claim 12, further comprising:

in response to a third command received from the host device, the third command designating one of the first and second subspaces, reporting the priority value of the one of the first and second subspaces designated in the third command.

17. The method according to claim 12, further comprising:

in response to a fourth command received from the host device, the fourth command designating a priority value, reporting information identifying a subspace corresponding to the priority value designated in the fourth command.

18. The method according to claim 12, further comprising:

starting up each of the first and second subspaces by generating mapping data needed for a conversion between a logical address and a physical address of the storage device.

19. The method according to claim 12 further comprising:

upon the start-up of the storage device, starting up the first and second subspaces in an ascending order of the priority values of the subspaces.

20. A system comprising:

a host device; and a storage device capable of communicating with the host device, the storage device comprising:

a nonvolatile semiconductor memory; and a controller configured to perform, in response to commands from the host device, a read operation and a write operation on the nonvolatile semiconductor memory, wherein the controller is configured to:

divide a logical address space of the storage device into a plurality of subspaces including a first subspace and a second subspace;

receive, from the host device, a priority value for each of the first and second subspaces, the priority values of the first and second subspaces determining an order for starting up the first and second subspaces upon start-up of the storage device;

manage the priority values of the first and second subspaces;

store a plurality of pieces of first log data for the first subspace in a first area of the nonvolatile semiconductor memory in which a plurality of pieces of second log data for the second subspace is not stored, the first area starting at a first physical address, store the plurality of pieces of second log data for the second subspace in a second area of the nonvolatile semiconductor memory in which the plurality of pieces of first log data for the first subspace is not stored, the second area starting at a second physical address different from the first physical address, the plurality of pieces of first log data and the plurality of pieces of second log data being used for restoring logical-to-physical address conversion information of the corresponding one of the first and second subspaces, the logical-to-physical address conversion information being used for a conversion between a logical address and a physical address of the nonvolatile semiconductor memory; and upon the start-up of the storage device, start up the first and second subspaces by reading the plurality of pieces of first log data from the first physical address and the plurality of pieces of second log data from the second physical address according to the managed priority values of the first and second subspaces such that the logical-to-physical address conversion information of the first subspace is restored earlier than the logical-to-physical address conversion information of the second subspace in a case in which the priority value of the first subspace is higher than the priority value of the second subspace, wherein the controller is further configured to not allow the read operation or the write operation to one of the first and second subspaces to be processed until the restoring of the logical-to-physical address conversion information of the one of the first and second subspaces has completed.

* * * * *